United States Patent
Vrzic et al.

(10) Patent No.: US 11,184,275 B2
(45) Date of Patent: Nov. 23, 2021

(54) SYSTEM AND METHOD FOR TRANSMISSION REDUNDANCY IN WIRELESS COMMUNICATIONS

(71) Applicant: HUAWEI TECHNOLOGIES CO., LTD., Shenzhen (CN)

(72) Inventors: Sophie Vrzic, Kanata (CA); Jaya Rao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 28 days.

(21) Appl. No.: 16/684,093

(22) Filed: Nov. 14, 2019

(65) Prior Publication Data

US 2020/0162366 A1   May 21, 2020

Related U.S. Application Data

(60) Provisional application No. 62/768,522, filed on Nov. 16, 2018.

(51) Int. Cl.
| | | |
|---|---|---|
| H04W 4/00 | (2018.01) | |
| H04L 12/761 | (2013.01) | |
| H04W 76/15 | (2018.01) | |
| H04W 88/08 | (2009.01) | |
| H04L 29/08 | (2006.01) | |
| H04W 4/70 | (2018.01) | |

(52) U.S. Cl.
CPC ............ *H04L 45/16* (2013.01); *H04W 76/15* (2018.02); *H04L 67/12* (2013.01); *H04W 4/70* (2018.02); *H04W 88/085* (2013.01)

(58) Field of Classification Search
None
See application file for complete search history.

(56) References Cited

U.S. PATENT DOCUMENTS

| | | | |
|---|---|---|---|
| 2016/0029283 A1 | 1/2016 | Wang et al. | |
| 2018/0199315 A1* | 7/2018 | Hong | H04W 88/10 |
| 2018/0368132 A1* | 12/2018 | Babaei | H04W 80/02 |
| 2019/0239279 A1* | 8/2019 | Shi | H04L 1/18 |

(Continued)

FOREIGN PATENT DOCUMENTS

| | | |
|---|---|---|
| CN | 108282823 A | 7/2018 |
| CN | 108370304 A | 8/2018 |
| CN | 110149730 A | 8/2019 |

OTHER PUBLICATIONS

Ericsson Higher layer multi-connection for IIoT, S2-1810107,3GPP TSG-SA WG2 Meeting #129 Oct. 5, 2018 (Oct. 5, 2018),sections 6.3.1, and 6.3. 1a.2,total 10 pages.

(Continued)

*Primary Examiner* — Phuongchau Ba Nguyen

(57) ABSTRACT

The present invention provides a system and method for ultra reliable low latency communication (URLLC) which can be achieved by redundant transmission with two or more links at one or more RAN nodes. In order to achieve URLLC communication, methods supporting the PDCP packet duplication and/or higher layer packet duplication are applied to various RAN architectures such as CA architecture, DC based architecture with one connection to the core network (CN), DC based architecture with two or more connections to the CN, CA and DC combined architecture, and CU/DU split architecture.

17 Claims, 19 Drawing Sheets

(56) References Cited

U.S. PATENT DOCUMENTS

2019/0394693 A1* 12/2019 Kim ..................... H04W 80/02
2021/0144583 A1* 5/2021 Xiao ........................ H04L 5/00

OTHER PUBLICATIONS

Hua Wei Higher layer multi-connection for IIoT R3-186973, 3GPP TSG-RAN3 Meeting #104 Nov. 3, 2018 (Nov. 3, 2018) section 2, total 6 pages.

* cited by examiner

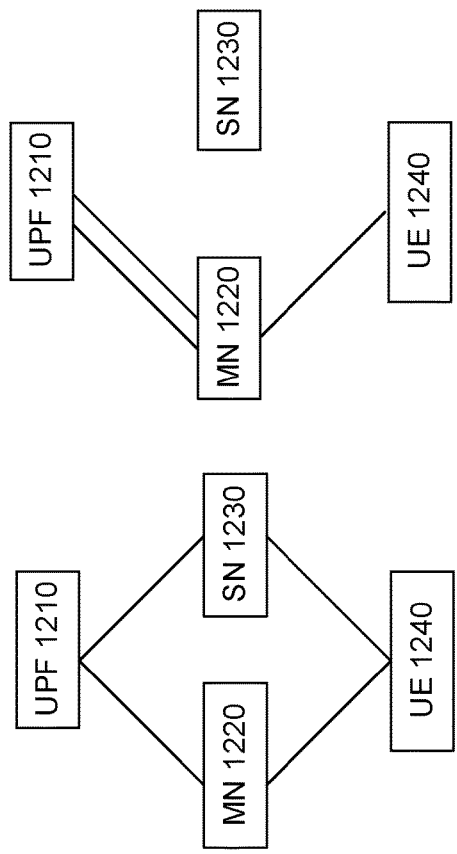
FIG. 12A
FIG. 12B
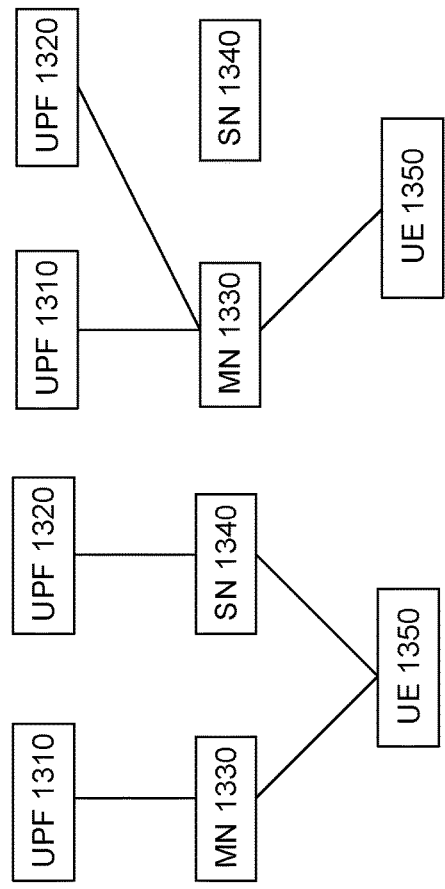
FIG. 13A
FIG. 13B

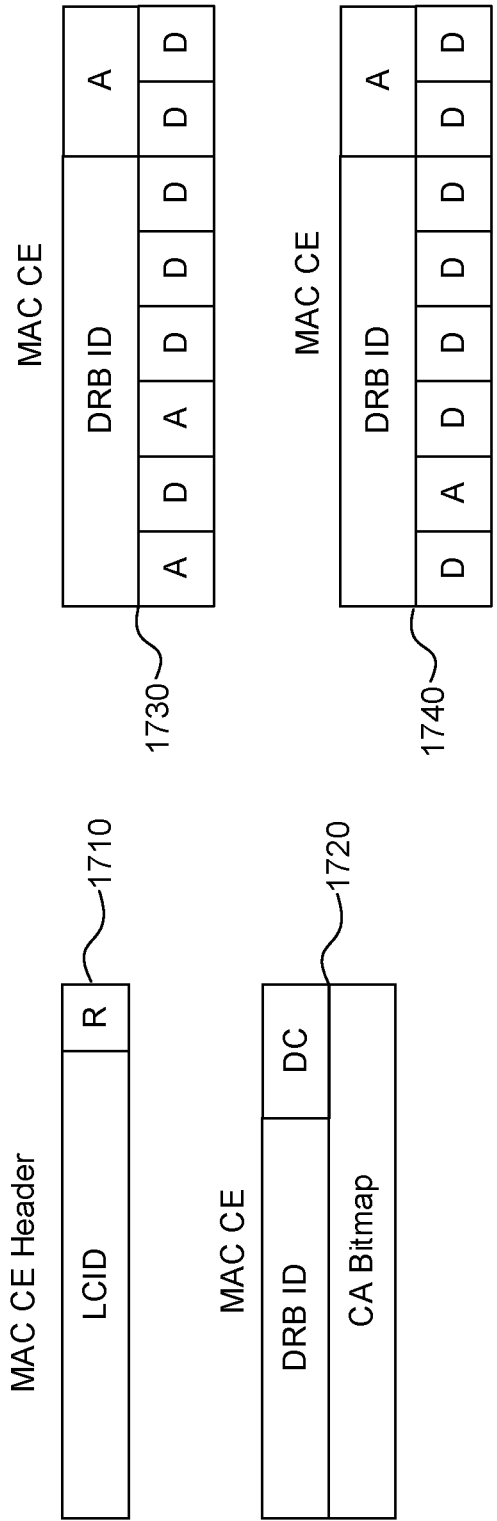
FIG. 17A
FIG. 17B
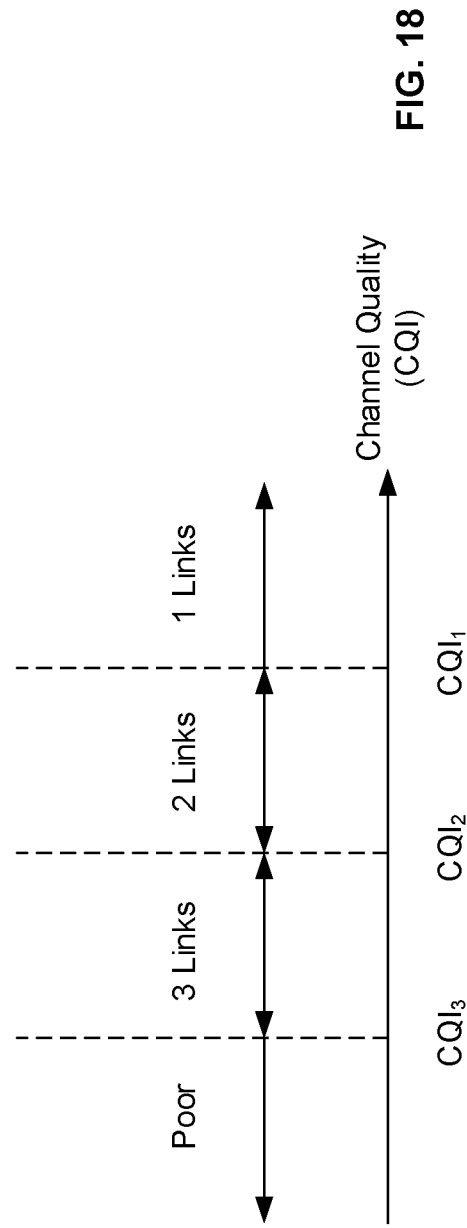
FIG. 18

| LCID | HLPD |

FIG. 20

| DRB ID |
| $f_1$ | $f_2$ | $f_3$ | $f_4$ |

FIG. 19A

| 2 | 3 | 4 | 2 |
| 3 | 4 | 3 |

FIG. 19B

| 2 | 3 | 4 | 4 |
| 3 | 4 | 3 |

FIG. 19C

SYSTEM AND METHOD FOR TRANSMISSION REDUNDANCY IN WIRELESS COMMUNICATIONS

CROSS-REFERENCE TO RELATED APPLICATIONS

This application claims the benefit of priority to U.S. Patent Application Ser. No. 62/768,522 entitled "SYSTEM AND METHOD FOR TRANSMISSION REDUNDANCY IN WIRELESS COMMUNICATIONS" filed Nov. 16, 2018, which is hereby incorporated by reference in its entirety.

FIELD OF THE INVENTION

The present invention pertains to the field of wireless communication networks and in particular to a system and method for communication redundancy therein. Particular embodiments relate to ultra reliable communication in industrial Internet of Things (IoT) applications.

BACKGROUND

Industrial IoT applications require ultra-high reliability and low-latency communication (URLLC) for many applications. Currently, URLLC can be delivered using packet duplication (PD) in either Dual Connectivity (DC) or Carrier Aggregation (CA) architectures, where two redundant links are used to improve the reliability without increasing the latency of the URLLC.

Industrial IoT applications often require a higher standard of reliability than the standards required by other URLLC applications. Approaches of increasing reliability via packet duplication using two links may not be sufficient to achieve the higher reliability standard for industrial IoT applications. Furthermore, such approaches may only address reliability in the Radio Access Network (RAN), while failing to address potential reliability issues in the Core Network (CN).

Therefore there is a need for ultra reliable transmission in industrial Internet of Things (IoT) applications, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and method for transmission redundancy. This may be applied for ultra reliable transmission in industrial IoT applications. Embodiments of the present invention may involve redundant transmission using two links, or with three or more links. Embodiments may involve dynamic control of Packet Data Convergence Protocol (PDCP) packet duplication and higher layer packet duplication. Embodiments of the present invention may provide for combined and coordinated PDCP duplication and higher layer packet duplication. The packet duplication (PDCP, higher layer, or both) may be dynamically activated and deactivated in order to apply it only when necessary, thus avoiding spectral inefficiencies.

According to embodiments of the present invention, there is provided a method for supporting packet duplication in a communication network that includes one or more radio access network (RAN) nodes. The method includes receiving, by a user equipment (UE) device, a medium access control (MAC) control element (CE) sent by at least one of the one or more RAN nodes. The MAC CE includes a PDCP duplication indicator for a data radio bearer. The PDCP indicator indicates one or more carriers associated with the data radio bearer to be used for PDCP layer packet duplication. The method then includes transmitting duplicate packets to the one or more RAN nodes using the one or more carriers.

In further embodiments, the MAC CE includes a bitmap. The bitmap includes a plurality of bits. Each of a plurality of bits of the bitmap includes the PDCP duplication indicator of a plurality of links.

In further embodiments, the MAC CE sent by at least one of the one or more RAN nodes further includes a higher layer duplication indicator indicative that packet duplication above the PDCP layer is required and the method includes transmitting higher layer duplicate packets to at least one of the one or more RAN nodes.

In further embodiments, the higher layer duplication indicator includes a bit field indicating whether the UE device is to perform the higher layer packet duplication.

In further embodiments, the PDCP duplication indicator and the higher layer duplication indicator are transmitted in a payload of the MAC CE.

In further embodiments, the duplicate packets are data packets or signaling packets.

In further embodiments, the duplicate packets are transmitted by the UE device using a carrier aggregation (CA) architecture, a dual connectivity (DC) architecture, or a combined CA and DC architecture.

In further embodiments, the DC architecture includes a single connection to a core network; or the DC architecture includes two separate connections to the core network and different ones of the duplicate packets above the PDCP layer are communicated via different ones of the two separate connections.

According to other embodiments of the present invention, there is provided a user equipment (UE) device in a communication network that includes one or more radio access network (RAN) nodes. The UE device is configured to receive a medium access control (MAC) control element (CE) sent by at least one of the one or more RAN nodes. The MAC CE includes a PDCP duplication indicator for a data radio bearer. The PDCP indicator indicates one or more carriers associated with the data radio bearer to be used for PDCP layer packet duplication. The UE device is also configured to transmit duplicate packets to at least one of the one or more RAN nodes using the one or more carriers.

In further embodiments, the MAC CE includes a bitmap. The bitmap includes a plurality of bits. Each of a plurality of bits of the bitmap includes the PDCP duplication indicator of a plurality of links.

In further embodiments, the MAC CE sent by at least one of the one or more RAN nodes further includes a higher layer duplication indicator indicative that packet duplication above the PDCP layer is required; and the UE devices is further configured to transmit higher layer duplicate packets to at least one of the one or more RAN nodes.

In further embodiments, the higher layer duplication indicator comprises a bit field indicating whether the UE device is to perform the higher layer packet duplication.

In further embodiments, the PDCP duplication indicator and the higher layer duplication indicator are transmitted in a payload of the MAC CE.

In further embodiments, the duplicate packets are data or signaling packets.

In further embodiments, the duplicate packets are transmitted by the UE device using a carrier aggregation (CA) architecture, a dual connectivity (DC) architecture, or a combined CA and DC architecture.

In further embodiments, the DC architecture includes a single connection to a core network; or the DC architecture includes two separate connections to the core network and different ones of the duplicate packets above the PDCP layer are communicated via different ones of the two separate connections.

According to other embodiments of the present invention, there is provided a non-transitory computer readable medium storing instructions executable by a user equipment (UE) device in a communication network including one or more radio access network (RAN) nodes. The instructions when executed by the UE device cause the UE device to receive a medium access control (MAC) control element (CE) sent by at least one of the one or more RAN nodes. The MAC CE includes a PDCP duplication indicator for a data radio bearer. The PDCP indicator indicating one or more carriers associated with the data radio bearer to be used for PDCP layer packet duplication. The instructions also cause the UE device to transmit duplicate packets to at least one of the one or more RAN nodes using the one or more carriers.

In further embodiments, the MAC CE includes a bitmap. The bitmap includes a plurality of bits. Each of a plurality of bits of the bitmap includes the PDCP duplication indicator of a plurality of links.

In further embodiments, the MAC CE sent by at least one of the one or more RAN nodes further includes a higher layer duplication indicator indicative that packet duplication above the PDCP layer is required, and the instructions when executed by the UE device further cause the UE device to transmit higher layer duplicate packets to at least one of the one or more RAN nodes.

In further embodiments, the higher layer duplication indicator includes a bit field indicating whether the UE device is to perform the higher layer packet duplication.

BRIEF DESCRIPTION OF THE FIGURES

Further features and advantages of the present invention will become apparent from the following detailed description, taken in combination with the appended drawings, in which:

FIGS. 12A and 12B are schematic diagrams illustrating the RAN requiring duplication in the CN with a single UPF, in accordance with embodiments.

FIGS. 13A and 13B are schematic diagrams illustrating the RAN requiring duplication in the CN with two UPFs, in accordance with embodiments.

FIGS. 17A and 17B are diagrams illustrating the formats of the MAC CE header and the MAC CE in CA or the combined CA and DC architecture, in accordance with embodiments.

FIG. 18 is a diagram illustrating mapping of channel quality indicator (CQI) to number of links required to meet the reliability standard, in accordance with embodiments.

FIGS. 19A to 19C are diagrams illustrating examples of the MAC CE for packet duplication with CA architecture or combined CA and DC architecture, in accordance with embodiments.

FIG. 20 is a schematic diagram illustrating the higher layer PD MAC CE format with a single bit that indicates whether or not higher layer PD is required, in accordance with embodiments.

It will be noted that throughout the appended drawings, like features are identified by like reference numerals.

DETAILED DESCRIPTION

Figure 1:
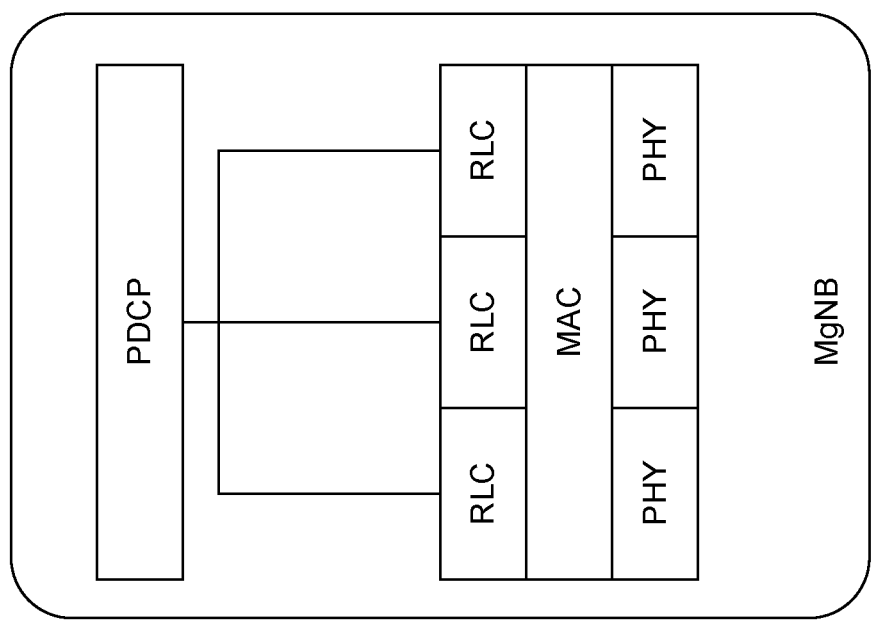
FIG. 1 is a schematic diagram illustrating the CA architecture supporting redundant transmission with more than two links, in accordance with embodiments.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Throughout the present disclosure, the terms carrier, link, logical channel and RLC entity are interchangeable used in the 3GPP standard in relation to URLLC.

Embodiments of the present invention provide a system and method for transmission redundancy in a wireless communication system comprising a radio access network (RAN) and core network (CN). Redundancy may be supported in the uplink direction, the downlink direction, or both. Embodiments of the invention will be presented in particular with respect to a system and method for ultra reliable low latency communication (URLLC) which can be achieved by redundant transmission with two or more links at one or more RAN nodes. However, it should be understood that the invention may also be applied in other contexts. In various embodiments, to provide for transmission redundancy, packets may be duplicated at the PDCP layer, at a layer above the PDCP layer, or a combination thereof. Packet duplication occurring at a layer above PDCP layer is referred to as higher layer packet duplication (HLPD). The PDCP packet duplication and higher layer packet duplication achieving URLLC are applicable to various RAN architectures such as a Carrier Aggregation (CA) architecture, a Dual Connectivity (DC) architecture with one connection to the core network (CN), a DC architecture with two or more connections to the CN, a CA and DC combined architecture, and a CU/DU split architecture. Each node in the CA and DC combined architecture has multiple carriers and a separate connection to the CN. The Central Unit (CU)/Distributed Unit (DU) split architecture can be regarded as an intra-node DC architecture. A person skilled in the art would understand that the layer above the PDCP layer (i.e., a higher layer) refers to any layer above layer 2 implemented in a UE and the RAN.

The present invention also provides a system and method for dynamically controlling PDCP packet duplication and HLPD. This can be performed using message passing to activate or deactivate packet duplication as required for reliability. Reliability may refer to a predetermined or prescribed reliability level for a given application. Reliability may directly or indirectly refer, for example, to a particular error rate or packet loss rate. Reliability may be prescribed for the RAN, the CN, or a combination thereof.

Potential advantages of the present invention include: (i) ability to use more than two redundant links with at most two RAN nodes; (ii) fast adaptation to the number of redundant links upon changes in the UE's channel quality; (iii) flexible UE implementation;

and (iv) low complexity in the network and in the UE. As used herein, the UE device may be an IoT device, such as an industrial IoT device. However, it is understood that the UE device may be another type of UE device capable of the communications functions as described herein.

FIG. 1 illustrates a CA architecture which supports redundant transmission with more than two links (three links are shown). According to embodiments, more than two redundant links may be configured using the CA architecture for packet duplication. The CA architecture may need only single radio access network (RAN) node (e.g. gNB, where gNB refers to a next-generation Node B device) to support redundant transmission. The UE duplicates packets and transmits the (duplicated) packets on multiple carriers (e.g. more than two) for reception by the single RAN node when required. In some embodiments, the UE may transmit the duplicated packets when the channel quality on the best link does not meet the standard required for URLLC. Otherwise, the UE may refrain from duplicating packets, or may use fewer (e.g. two) carriers for CA based packet duplication. In various embodiments using the CA architecture for packet duplication, the UE may map the duplicated packets to a direct radio bearer. CA based packet duplication refers to using a radio bearer that is configured for a CA architecture for packet duplication. DC based packet duplication refers to using a radio bearer that is configured for a DC architecture for packet duplication. Combined CA and DC based packet duplication refers to using a radio bearer that is configured for both CA and DC architectures for packet duplication.

Figure 2:
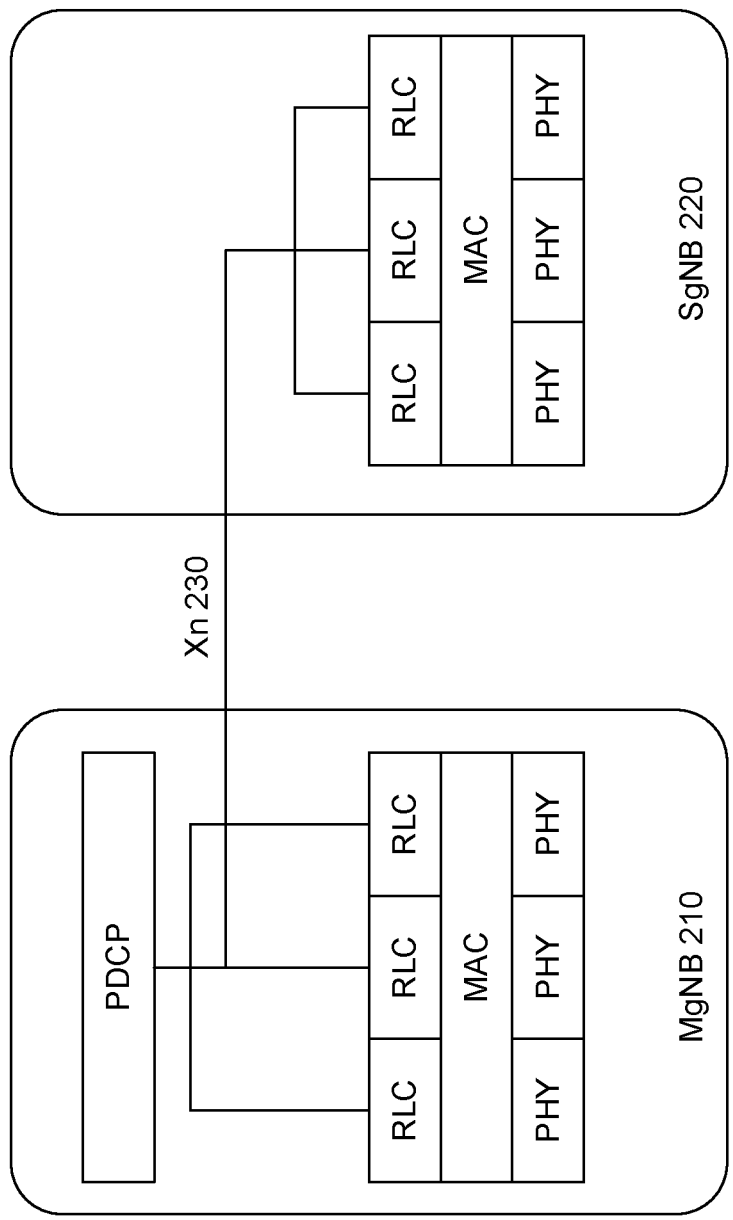
FIG. 2 is a schematic diagram illustrating the combined CA and DC architecture supporting redundant transmission with more than two links, in accordance with embodiments.

In other embodiments, radio bearers may be configured with both CA and DC capability in order to support redundant transmission with more than two links or selecting two or more links from multiple links. This combined CA and DC architecture allows for more flexible use of the available links. The radio bearers can be either signalling radio bearers (SRBs) or data radio bearers (DRBs). FIG. 2 illustrates a combined CA and DC architecture which supports redundant transmission with two or more links from multiple available links.

Referring to FIG. 2, the Master gNB (MgNB) 210 and the secondary gNB (SgNB) 220 are both configured to perform CA. The MgNB 210 and the SgNB 220 are connected to each other through the Xn interface 230. There is only one connection to the CN (e.g. through the MgNB 210). An architecture with two connections to the CN will be discussed elsewhere herein, for example in paragraphs regarding higher layer packet duplication (i.e., packet duplication at a layer above layer 2 implemented in the UE and RAN). In the present disclosure a MgNB is also referred to as a master node (MN) and a SgnB is also referred as a secondary node (SN).

In various embodiments with the combined CA and DC architecture, the UE may use multiple links across a master gNb (MgNB) 210 and a secondary gnB (SgNB) 220 by using multiple carriers on at least one of the MgNB 210 and the SgNB 220. Thus, for uplink, the UE transmits to both the MgNB 210 and the SgNB 220 provides DC, and also uses CA for transmission to one or both the MgNB 210 and the SgNB 220. For example, the UE can use two carriers of the MgNB 210 and one carrier of the SgNB 220. In this case, the UE maps the packets to a split bearer (i.e., a split radio bearer).

In some embodiments, the UE may (e.g. at a different time) transmit redundant packets on multiple carriers to only one of the MgNB 210 and the SgNB 220 (e.g. MgNB 210). In this case, the UE uses a direct bearer (i.e., a direct radio bearer).

Figure 3:
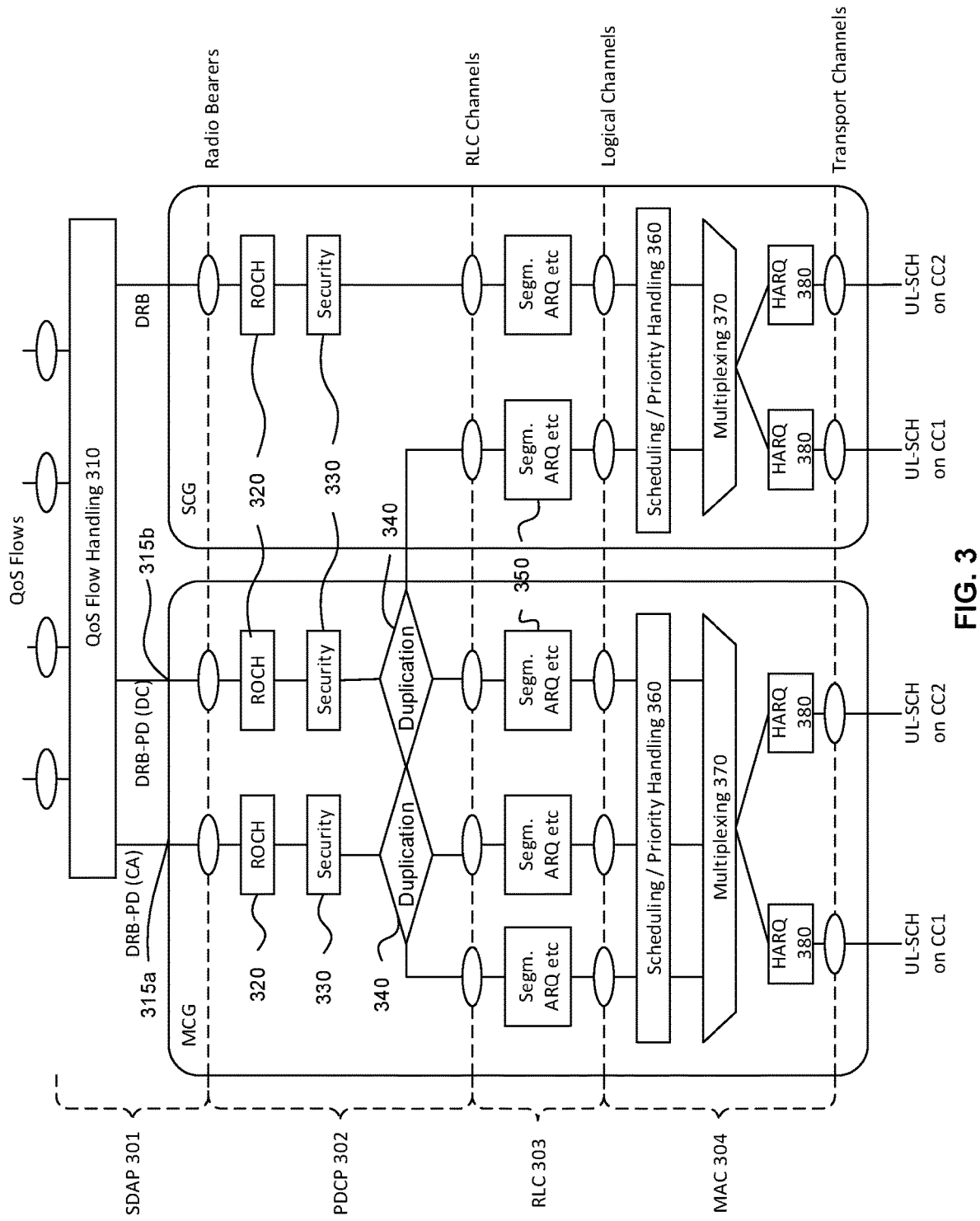
FIG. 3 is a schematic diagram illustrating the layer 2 UE architecture for PDCP duplication using either CA or DC based packet duplication, in accordance with embodiments.

FIG. 3 illustrates the layer 2 UE architecture for PDCP duplication using either CA or DC. This approach is also included in the 3rd Generation Partnership Project standards documents for New Radio (NR), Release 15, commonly referred to as 3GPP NR Rel-15.

Referring to FIG. 3, the layer 2 UE architecture shown in FIG. 3 comprises a Service Data Adaptation Protocol (SDAP) layer 301, Packet Data Convergence Protocol (PDCP) layer 302, Radio Link Control (RLC) layer 303 and Medium Access Control (MAC) layer 304. The SDAP layer 301 includes QoS Flow handling function 310. The PDCP layer 302 includes Robust Header Compression (RoHC) function 320, security function 330 and packet duplication function 340. The RLC layer 303 comprises, among other things, Segmentation and Automatic Repeat reQuest (ARQ) functions 350 known in the art. The MAC layer 304 includes Scheduling and Priority functions 360, multiplexing 370 and Hybrid Automatic Repeat request (HARD) 380, known in the art.

According to embodiments, one DRB-PD using CA (at 315a) and one DRB-PD using DC (at 315b) are configured for packet duplication at Master Cell Group (MCG). The packets that are sent on the DRB-PDs at 315a and 315b may be duplicated after the RoHC function 320 and security functions 330 are performed. The duplication function 340 may be implemented in the PDCP layer 302, and may be based on information provided by the MAC layer 304.

According to embodiments, only MCG is configured to have the packet duplication function 340. However, the packet duplication function 340 is not only connected to the RLC layer 303 of MCG but also connected to the RLC layer 303 of Secondary Cell Group (SCG), for example to Segmentation and Automatic Repeat reQuest (ARQ) functions 350 of SCG.

According to embodiments, some changes may be required in order to increase the number of redundant links to greater than 2. In some embodiments, this may be supported by keeping the maximum number of nodes used for URLLC communications to two (i.e. the master node (MN) and secondary node (SN)). The radio bearer used, when keeping the maximum number of nodes used for URLLC communications to two, can be a split radio bearer where one or more of the nodes have the capability to use multiple carriers.

Figure 4:
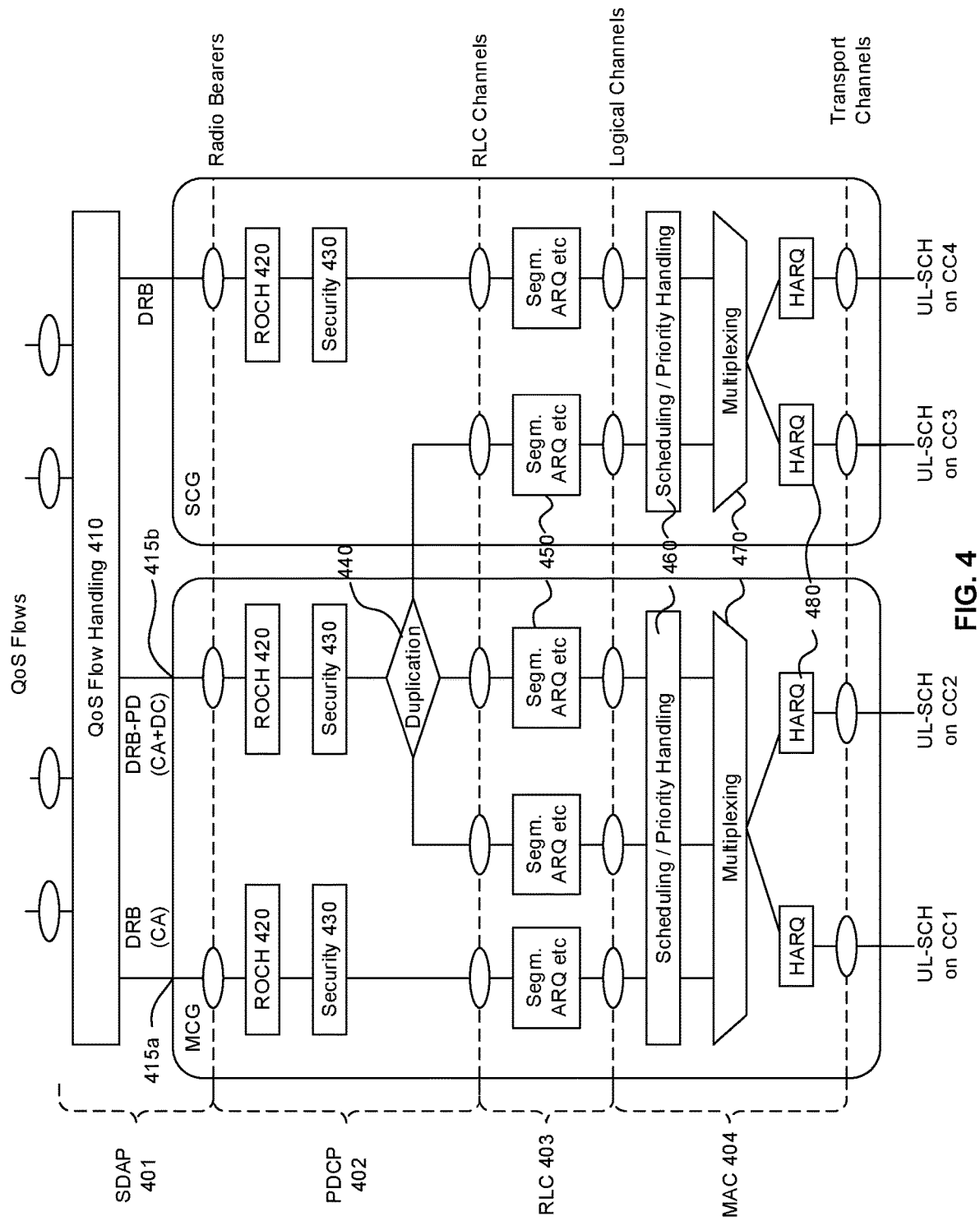
FIG. 4 is a schematic diagram illustrating the layer 2 UE architecture for PDCP duplication using a combined CA and DC based packet duplication, in accordance with embodiments.

FIG. 4 illustrates the layer 2 UE architecture for PDCP packet duplication using both CA and DC architectures, which can be referred to as combined CA and DC architecture. According to embodiments, in the combined CA and DC architecture, the UE makes the packet duplication decision at the PDCP layer (e.g. PDCP layer 402). The UE determines the number of links that are required and the best links (or at least a set of adequate quality links) to use for data transmission.

Referring to FIG. 4, the architecture shown in FIG. 4 comprises SDAP layer 401, PDCP layer 402, RLC layer 403 and MAC layer 404. The SDAP layer 401 includes QoS Flow handling function 410. The PDCP layer 402 includes RoHC function 420, security function 430 and packet duplication function 440. The RLC layer 403 comprises, among other things, Segmentation and Automatic Repeat reQuest (ARQ) functions 450 known in the art. The MAC layer 404 includes Scheduling and Priority functions 460, multiplexing 470 and Hybrid Automatic Repeat request (HARD) 480, known in the art.

According to embodiments, among the DRB-PD using CA (at 415a) at MCG and the DRB-PD using both CA and DC (at 415b) at MCG, only the latter is configured for packet duplication. The packets that are sent on the DRB-PDs at 415b may be duplicated after the RoHC function 420 and security functions 430 are performed. The duplication function 440 may be implemented in the PDCP layer 402, and may be based on information provided by the MAC layer 404.

According to embodiments, only MCG is configured to have the packet duplication function 440. However, the packet duplication function 440 is not only connected to the RLC layer 303 of MCG but also connected to the RLC layer 303 of Secondary Cell Group (SCG), for example to Segmentation and Automatic Repeat reQuest (ARQ) functions 450 of SCG. As shown, and in contrast to FIG. 3, the packet duplication function 440 can perform packet duplication within a single cell group (e.g. MGC), which corresponds to CA, and may simultaneously perform packet duplication between two cell groups (MGC and SGC), which corresponds to DC. In this architecture, the UE can select any combination of links to satisfy the reliability requirement. For example, the UE can perform CA based packet duplication to only one node or it may use both nodes using DC. The UE may also use both CA and DC.

In 3GPP New Radio (NR), a gNB may be separated into a central unit (CU) and one or more distributed units (DUs). In other words, a gNB may consist of a gNB-CU and one or more gNB-DU(s). A gNB-CU and a gNB-DU are connected via F1 interface. One gNB-DU is connected to only one gNB-CU. Embodiments of the present invention may operate with such an architecture, i.e. a CU/DU split RAN architecture.

Figure 5:
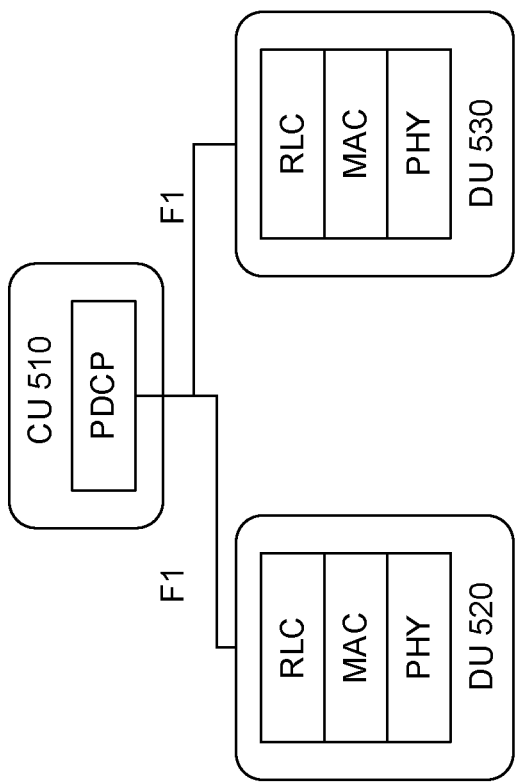
FIG. 5 is a schematic diagram illustrating the RAN architecture with a CU/DU split, in accordance with embodiments.

FIG. 5 illustrates the RAN architecture with a CU/DU split. The CU 510 comprises a PDCP entity. Each of the DU 520 and the DU 530 comprise respective RLC entities, MAC entities and physical (PHY) entities. Each of the DU 520 and the DU 530 is connected to the CU 510 via a respective F1 interface as illustrated. A person skilled in the art would understand that a PDCP entity is an entity within the PDCP layer that performs the PDCP functions, a RLC entity is an entity within the RLC layer that performs the RLC functions, the MAC entity is an entity within the MAC layer that performs MAC functions, and a PHY entity is an entity within the PHY layer that performs PHY functions.

Figure 6:
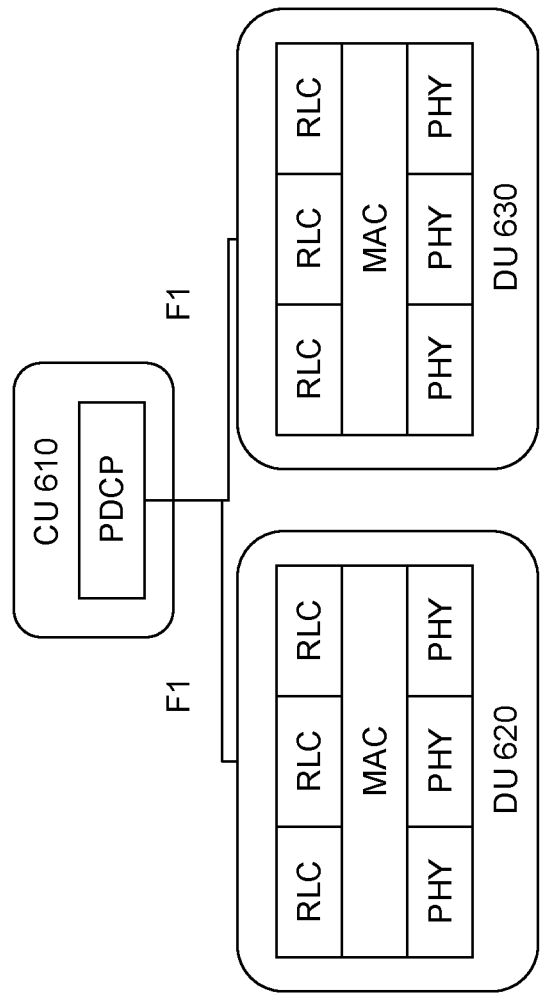
FIG. 6 is a schematic diagram illustrating the CU/DU split (RAN) architecture supporting CA at each DU, in accordance with embodiments.

According to embodiments, the CU/DU split architecture (e.g. the RAN architecture in FIG. 5) may be configured to have CA capability, if multiple carriers are supported by at least one DU. Such architecture, the CU/DU split (RAN) architecture supporting CA at each DU, is illustrated in FIG. 6. Referring to FIG. 6, the CU 610 comprises PDCP entity. RLC, MAC and PHY entities are included in each of the DU 620 and the DU 630. In particular, three PHY entities and three RLC entities are included in each of the DU 620 and the DU 630 as CA is supported at each of the DUs. Similar to the RAN architecture of FIG. 5, each of the DU 620 and the DU 630 is connected to the CU 610 via F1 interface as illustrated.

The CU/DU split (RAN) architecture supporting CA based packet duplication at each DU, illustrated in FIG. 6, is similar to DC architecture. That is, rather than the UE transmitting to two gNBs, it transmits to two DUs. Due to the similarity, this architecture can be considered as intra-gNB DC. According to embodiments, redundant transmission may be supported for URLLC traffic by allowing the UE to connect to multiple DUs, similar to the data transmission in the DC architecture. According to embodiments, the UE's implementation is same as the UE's implementation for the inter-gNB/eNB DC. URLCC traffic refers to a flow of data packets with certain QoS requirements that has high reliability and low latency.

Figure 7:
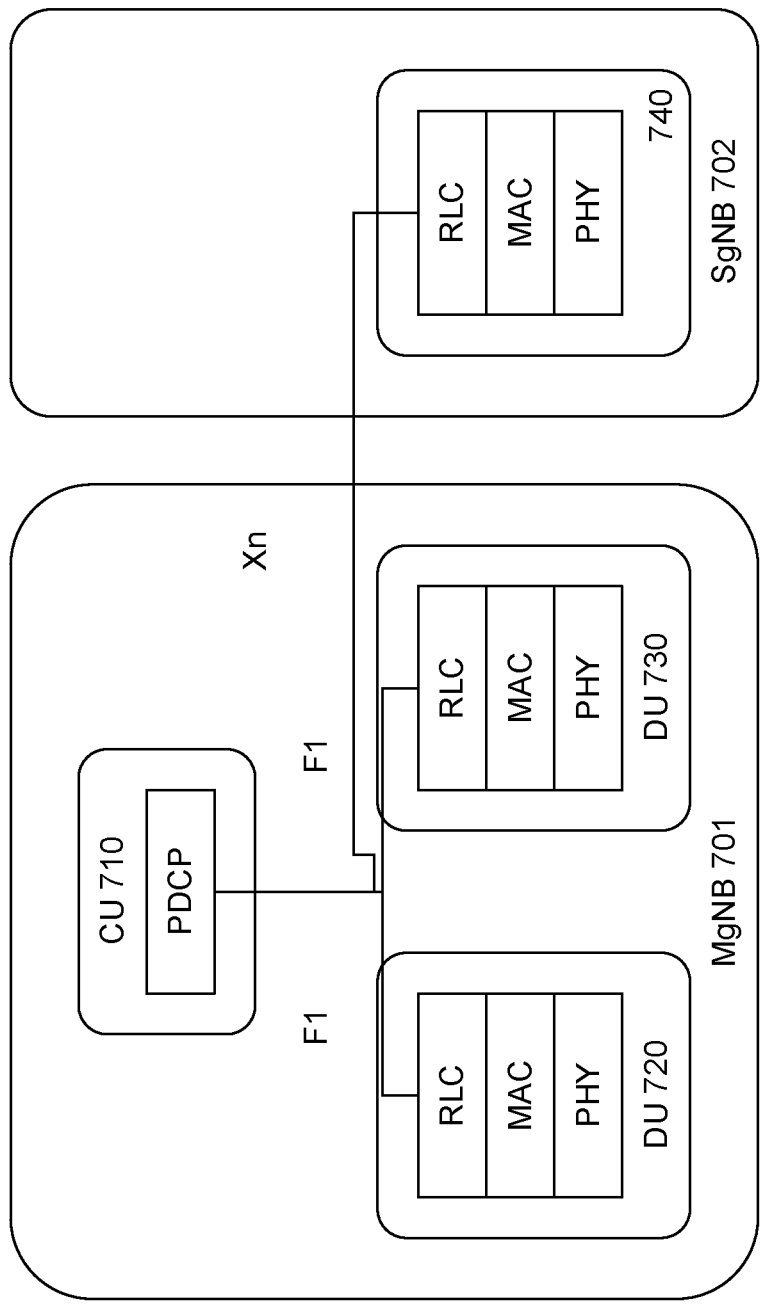
FIG. 7 is a schematic diagram illustrating the DC architecture with CU/DU split in master node, in accordance with embodiments.
Figure 8:
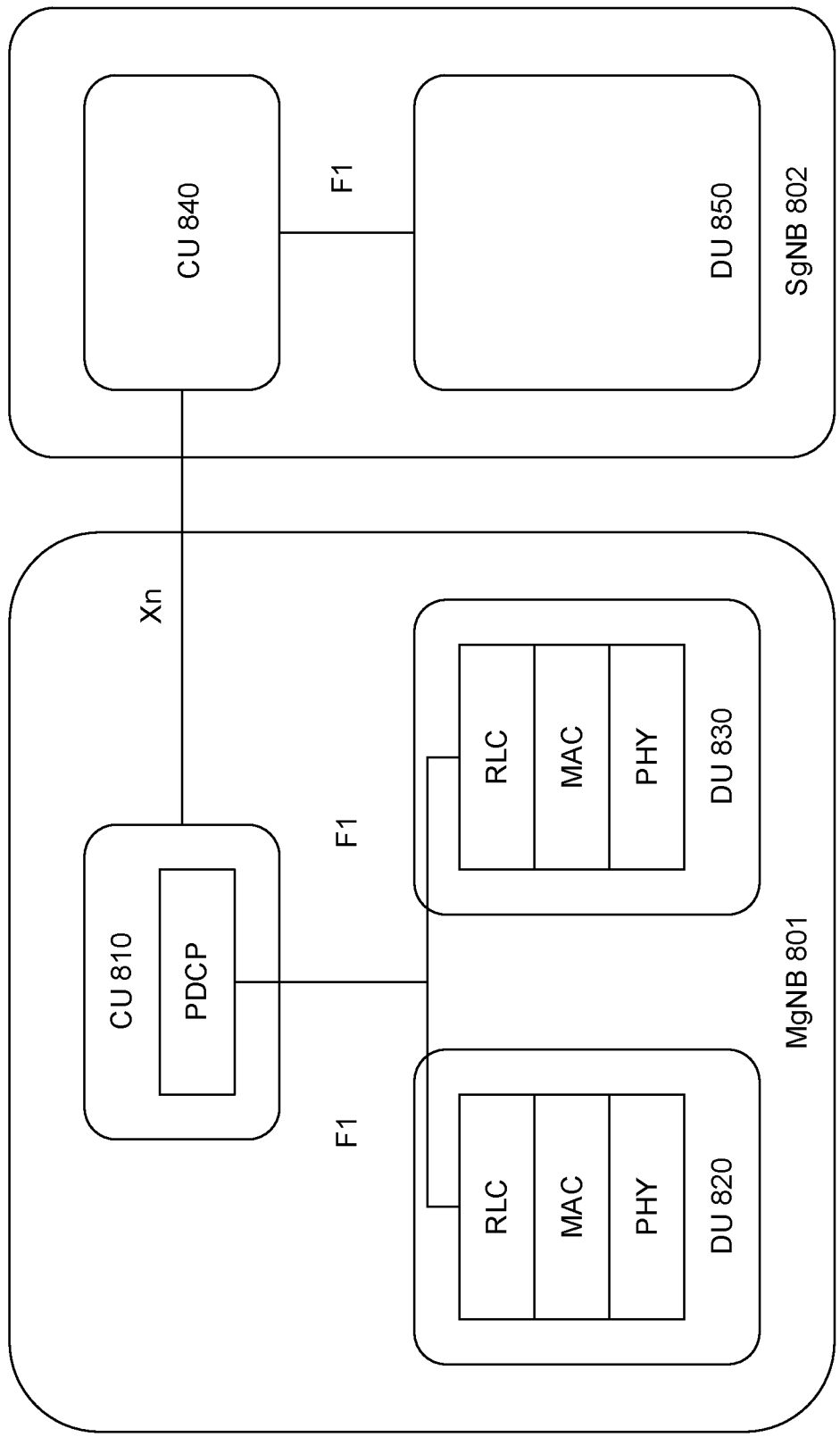
FIG. 8 is a schematic diagram illustrating the DC architecture with CU/DU split in the both master node and secondary node, in accordance with embodiments.

The CU/DU split architecture can be combined with inter-node DC architectures as illustrated in FIGS. 7 and 8. In some embodiments, the CU/DU split is implemented only at the master (RAN) node, the MgNB 701, as shown in FIG. 7. The CU 710 comprises PDCP entity. Each of the DU 720 and the DU 730 comprises RLC entity, MAC entity and PHY entity. Each of the DU 720 and the DU 730 is connected to the CU 710 via F1 interface as illustrated. The secondary (RAN) node, the SgNB 702, comprises the unit 740 which includes RLC entity, MAC entity and physical (PHY) entity. The secondary (RAN) node, SgNB 702, does not (in the present illustration) include CU or PDCP entity. Instead, the unit 740 in the SgNB is connected to the CU 710, which includes PDCP entity, through Xn interface.

In some embodiments, the CU/DU split is implemented in both MgNB and the SgNB, as shown in FIG. 8. Referring to FIG. 8, the architecture of the MgNB 801 is similar to that of the MgNB 701 in FIG. 7. The CU 810 comprises PDCP entity, and each of the DU 820 and the DU 830 comprises RLC entity, MAC entity and PHY entity. Also, each of the DU 820 and the DU 830 is connected to the CU 810 via F1. On the other hand, the SgNB 802 is somewhat different from that in FIG. 7. As stated above, CU/DU split is also implemented in the SgNB 802; thus the CU 840 and the DU 850 are included in the SgNB 802. As in the MgNB 801, the DU 850 is connected to the CU 840 via F1. The MgNB 801 and SgNB 802 are associated each other through the Xn interface which connects CU 840 of SgNB 802 and the CU 810 of MgNB 801. The SgNB 802 may have additional DUs (not shown).

In some embodiments, multiple carriers are supported at one or more of the nodes in inter-node DC architecture. In such case, CA may be implemented at the inter-node DC based architecture, as illustrated in FIG. 9.

Figure 9:
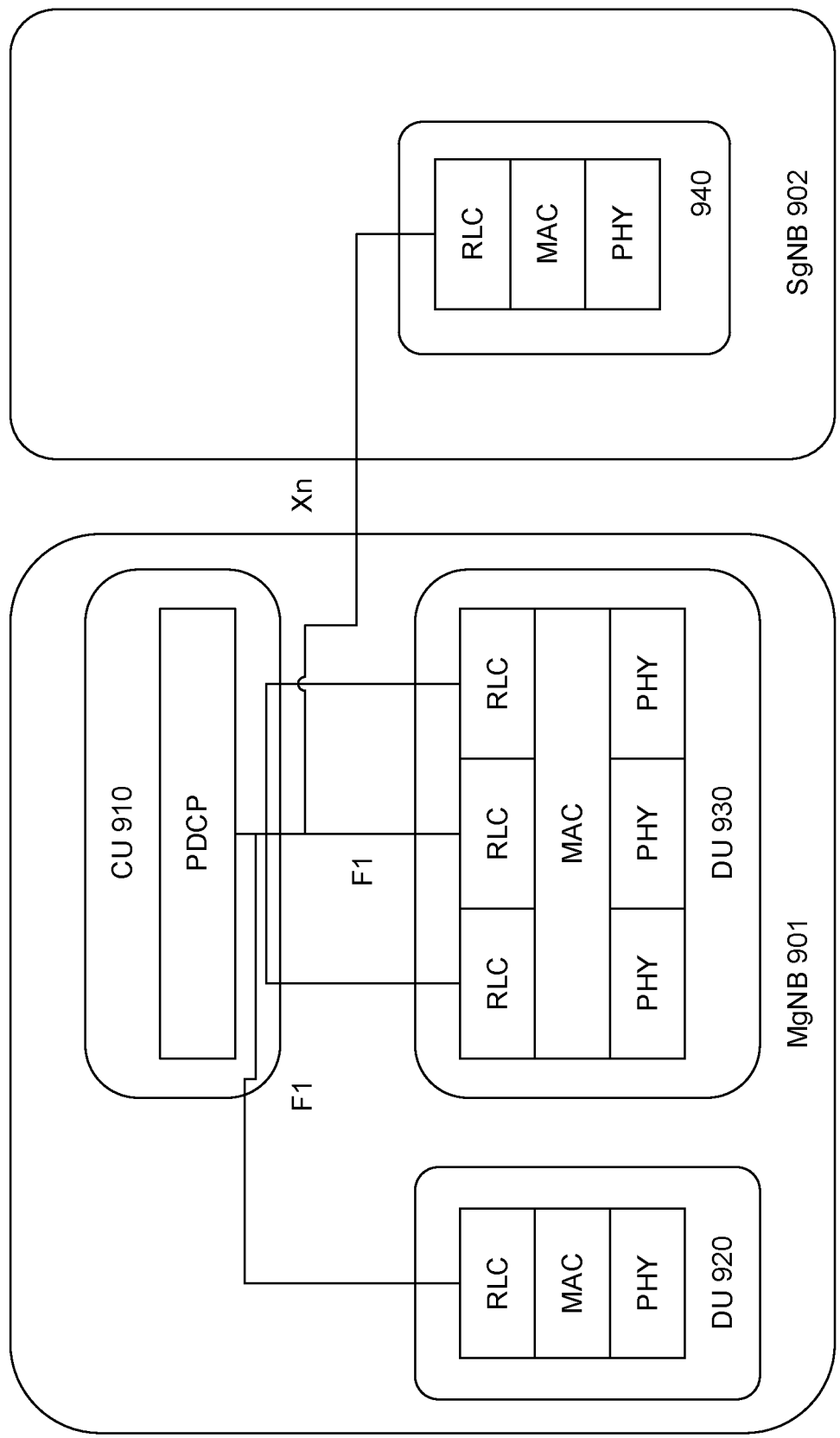
FIG. 9 is a schematic diagram illustrating the DC architecture with CU/DU Split and CA in master node, in accordance with embodiments.

Referring to FIG. 9, the MgNB 901 is implemented using a split CU/DU architecture. According to embodiments, one or more DUs can be configured with CA. In FIG. 9, the DU 930 in the MgNB 901 is configured with CA. In other embodiments, the other DU 920 can also be configured with CA. According to embodiments, redundant transmission may be configured by selecting two of the nodes (or two of the DUs). In one case, two DUs in the MgNB 901 (e.g. DU 920 and 930) may be selected for supporting redundant transmission. In other case, one DU from the MgNB 901 (DU 920 or DU 930) and the SgNB 902 (or a DU thereof) may be selected for supporting redundant transmission. If more than two (redundant) links are required to meet the reliability standard for URLLC, then a node which supports multiple carriers may be selected (e.g. the DU 930 which supports multiple carriers), and CA can be used in addition to DC.

Further referring to FIG. 9, the CU 910 comprises a PDCP entity. RLC, MAC and PHY entities are included in each of the DU 920 and the DU 930. In particular, three PHY entities and three RLC entities are included in the DU 930 as CA is supported thereby. The DU 920 and the DU 930 are connected to the CU 910 via the F1 interface as illustrated. In case of the DU 930, each of the three RLC entities is connected to the PDCP in the CU 910 via the F1 interface. The MgNB 901 and SgNB 902 are associated each other through the Xn interface which connects the unit 940 of SgNB 902 and the CU 910 of MgNB 901.

According to various embodiments, the layer 2 UE architecture for the DC based architecture with CU/DU split and CA (e.g. the architecture illustrated in FIG. 9) is the same as the UE layer 2 architecture for the combined CA and DC based architecture (e.g. the layer 2 UE architecture illustrated in FIG. 4). In the present disclosure, term layer 2 UE architecture refers to the layer 2 protocol stack in the UE consisting of the SDAP 401, PDCP 402, RLC 403, MAC 404, and PHY layers.

Figure 10:
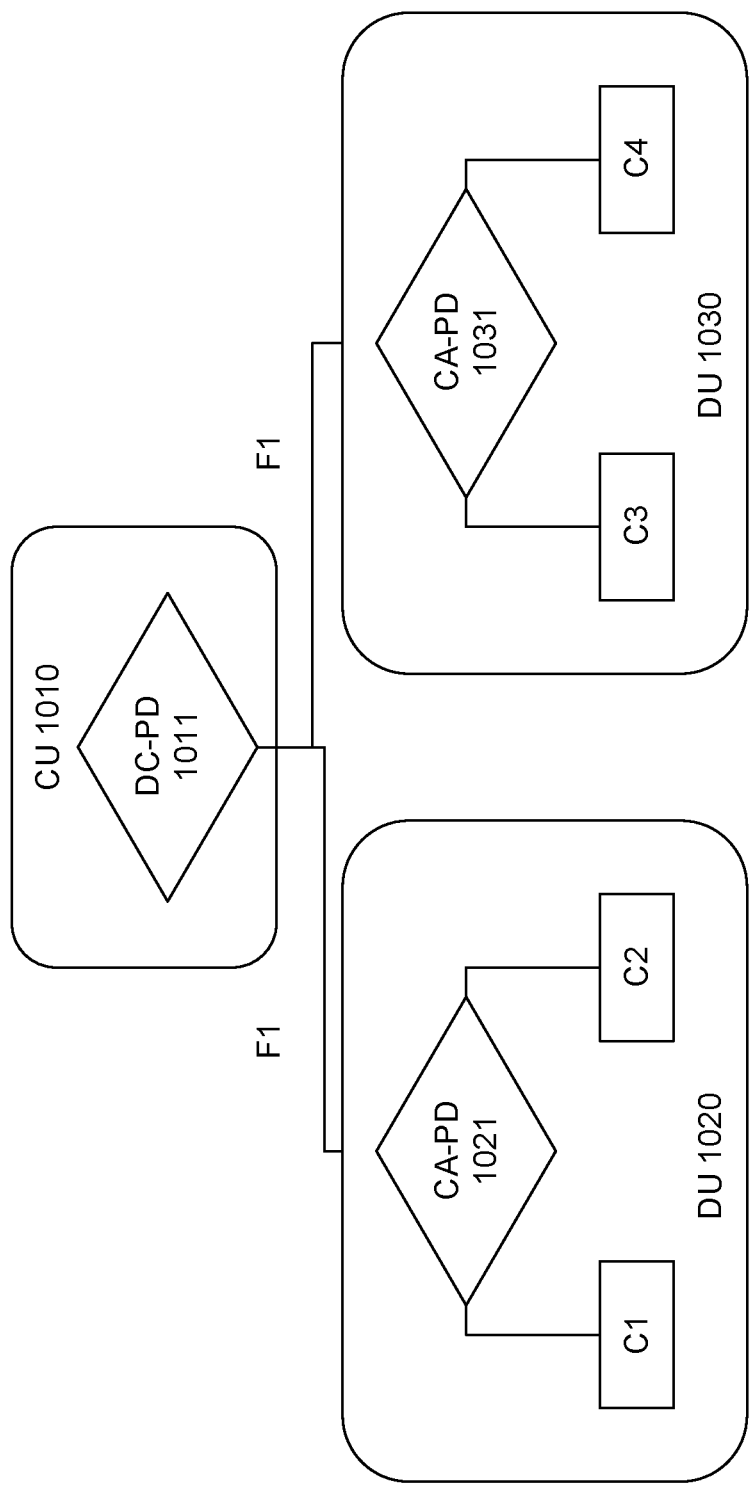
FIG. 10 is a schematic diagram illustrating the CU/DU split architecture for DL Packet duplication, in accordance with embodiments.

According to embodiments of the present invention, in the case of downlink (DL) packet duplication, there are two options for enabling CA and intra-node DC in the CU/DU split architecture. In the first option, the CU can determine whether or not to activate intra-node DC duplication to multiple DUs. The DUs can individually determine if CA duplication should be activated. One example architecture implementing the first option is illustrated in FIG. 10. Referring to FIG. 10, the CU 1010 includes the DC based packet duplication decision function 1011 which determines whether or not to activate DC based packet duplication in a given situation. The DU 1020 and the DU 1030 include the CA based packet duplication decision functions 1021 and 1031, respectively, which determine whether or not to activate CA based packet duplication in a given situation. The CU 1010 is connected to each of the DU 1020 and the DU 1030 via the F1 interface, as done in other intra-node DC architectures.

Figure 11:
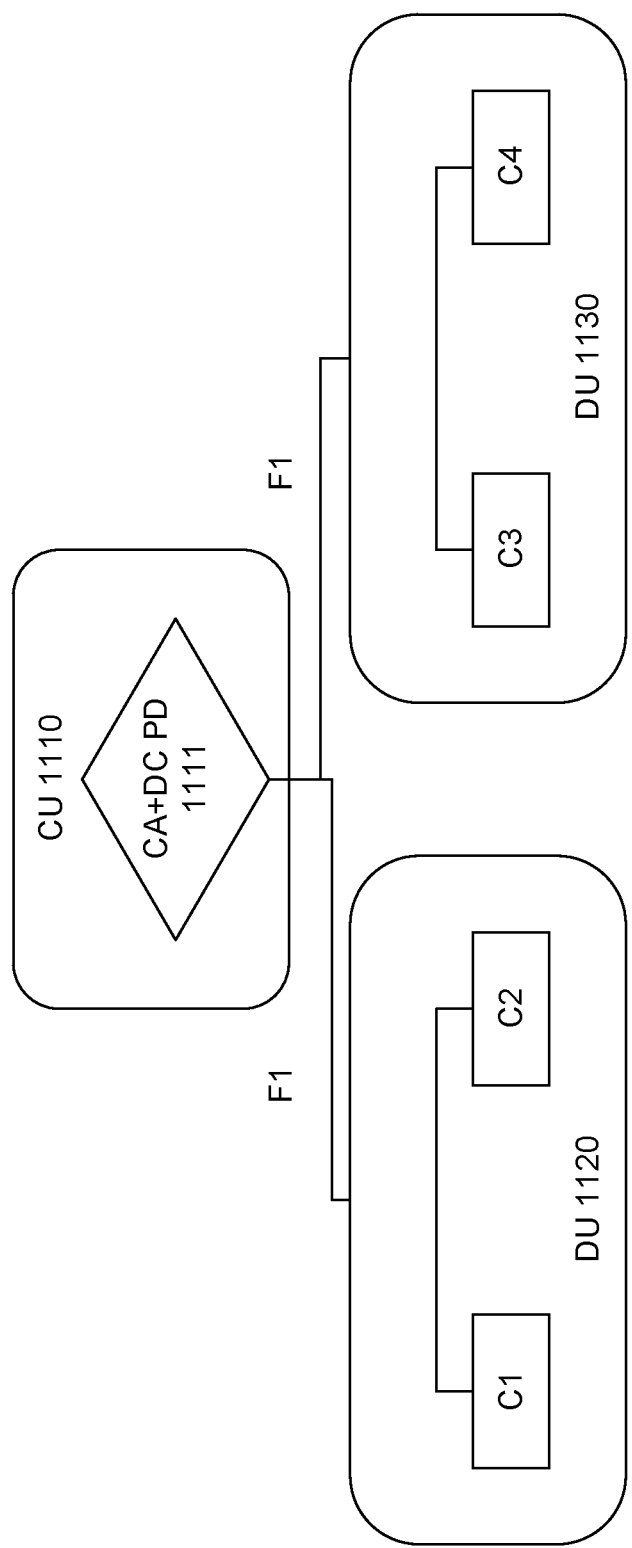
FIG. 11 is a schematic diagram illustrating the other CU/DU split architecture for DL Packet duplication, in accordance with embodiments.

In the second option, the CU can determine both the intra-node DC duplication and the CA duplication at each DU. One example architecture implementing the second option is illustrated in FIG. 11. Referring to FIG. 11, the CU 1110 includes the combined packet duplication decision function 1111 which determines whether or not to activate DC based packet duplication, and also determines whether or not to activate CA based packet duplication. The DU 1020 and the DU 1030 do not necessarily include a decision function. As in FIG. 10, the CU 1110 is connected to each of the DU 1120 and the DU 1130 via the F1 interface. In both FIGS. 10 and 11, the DUs each support at least two carriers, i.e. C1 and C2 for one DU, and C3 and C4 for the other DU, thereby supporting CA. The presence of two DUs can be used to support DC. Thus, both CA and DC are supported, possibly concurrently. In some embodiments, the DUs may support the same set of carriers. In this case, the UE can select a carrier from the node with the best channel conditions.

To further support transmission reliability, embodiments of the present invention support packet duplication at a layer of the layer 2 protocol stack above the PDCP layer, referred to herein as HLPD. For example, multiple redundant links may be required in the CN in order to meet a high end-to-end reliability requirement. According to embodiments, higher layer packet duplication may be achieved by adding a packet duplication and removal function in the user plane function (UPF). A single UPF or multiple UPFs may be selected for URLLC protocol data unit (PDU) sessions depending on the reliability of the nodes and links in the CN. Multiple UPFs may further provide redundancy for improved reliability. According to embodiments, if the reliability of nodes or links in the CN does not meet the reliability requirement (e.g. probability that nodes or links in the CN fail is higher than required for a specified level of reliability) for URLLC PDU sessions, two or more redundant links and nodes can be used to improve the end-to-end reliability. This type of packet duplication requires a DC architecture with two connections to the CN (e.g. from MN and SN). In this DC architecture with two N3 tunnels, there is a full protocol stack at both nodes in contrast to having a single PDCP function as in the case of the DC architecture with one N3 tunnel.

According to embodiments, higher layer packet duplication is activated when redundancy is required in both the RAN and the CN, as illustrated in FIGS. 12A and 13A. On the other hand, when packet duplication is deactivated in the RAN and the CN still requires redundancy, cases illustrated in FIGS. 12B and 13B are used.

FIGS. 12A and 12B illustrate higher layer packet duplication in the CN with a single UPF for a URLLC PDU session. When higher layer packet duplication is activated in the RAN, as shown in FIG. 12A, a single UPF in the CN, the UPF 1210, is connected to both a master node and a secondary node, e.g. MN 1220 and SN 1230, via links in the CN. As both MN 1220 and SN 1230 are connected to the UPF 1210, both of them are communicatively connected to the UE 1240 via links in the RAN. On the other hand, when higher layer packet duplication is deactivated in the RAN, as shown in FIG. 12B, the UPF 1210, is only connected to the master node, MN 1220, via links in the CN. However, the UPF 1210 is connected to the MN 1220 via multiple links to facilitate the CN duplication. As only MN 1220 is connected to the UPF 1210, UE 1240 is only connected to the MN 1220 via a link in the RAN. The term CN duplication refers to high layer packet duplication performed above layer 2 in the CN.

Similarly, FIGS. 13A and 13B illustrate a RAN requiring higher layer packet duplication in the CN with two UPFs for URLLC PDU session. When higher layer packet duplication is activated in the RAN, as shown in FIG. 13A, the two UPFs in the CN, UPF 1310 and UPF 1320, are connected to master node MN 1330 and secondary node SN 1340, respectively, via network links. As MN 1330 and SN 1340 are connected to the UPF 1310 and UPF 1320, both of them are communicatively connected to the UE 1350 via links in the RAN. On the other hand, when higher layer packet duplication is deactivated in the RAN, as shown in FIG. 13B, both of the UPF 1310 and UPF 1320, are only connected to the master node, MN 1330, via network links. As only MN 1330 is connected to the two UPFs, UE 1350 is only connected to the MN 1330 via the network link. The dual connections to the dual UPFs provides for redundancy in the CN.

Figure 14:
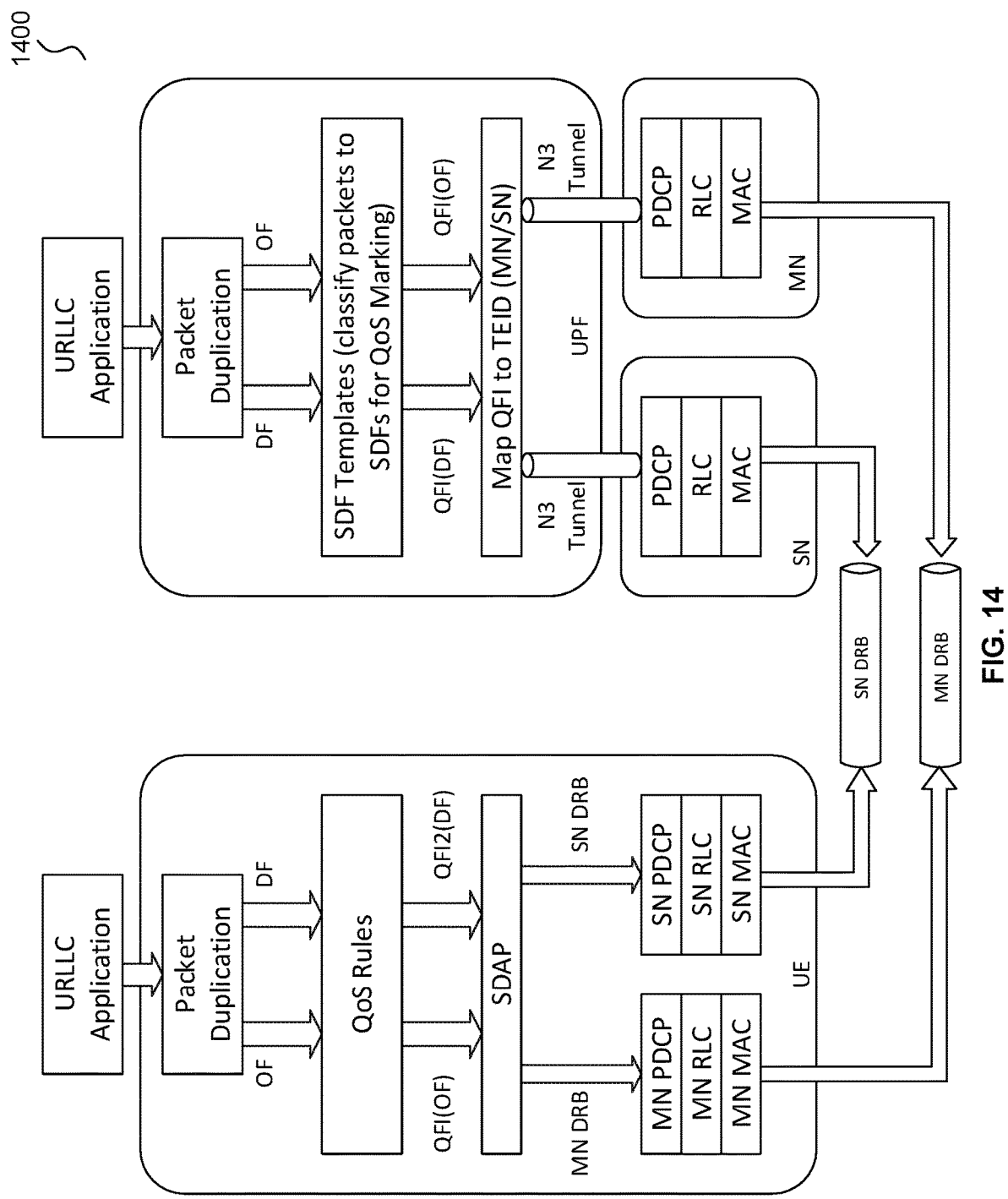
FIG. 14 is a schematic diagram illustrating the overall architecture for higher layer packet duplication with a single UPF in the CN, in accordance with embodiments.

FIG. 14 illustrates the architecture 1400 for higher layer packet duplication with a single UPF in the CN. Functionality related to the single UPF is illustrated above the MN and SN. According to embodiments, direct radio bearers are configured in both the MN and SN. The radio bearers for higher layer packet duplication with a single UPF in the CN are not split bearers as in DC based PDCP packet duplication with a single connection to the CN. According to embodiments, in higher layer packet duplication, at least one network link can also use CA based packet duplication. This allows more than two redundant links being configured across the two nodes (e.g. MN and SN) when the UE is configured with DC.

Figure 15:
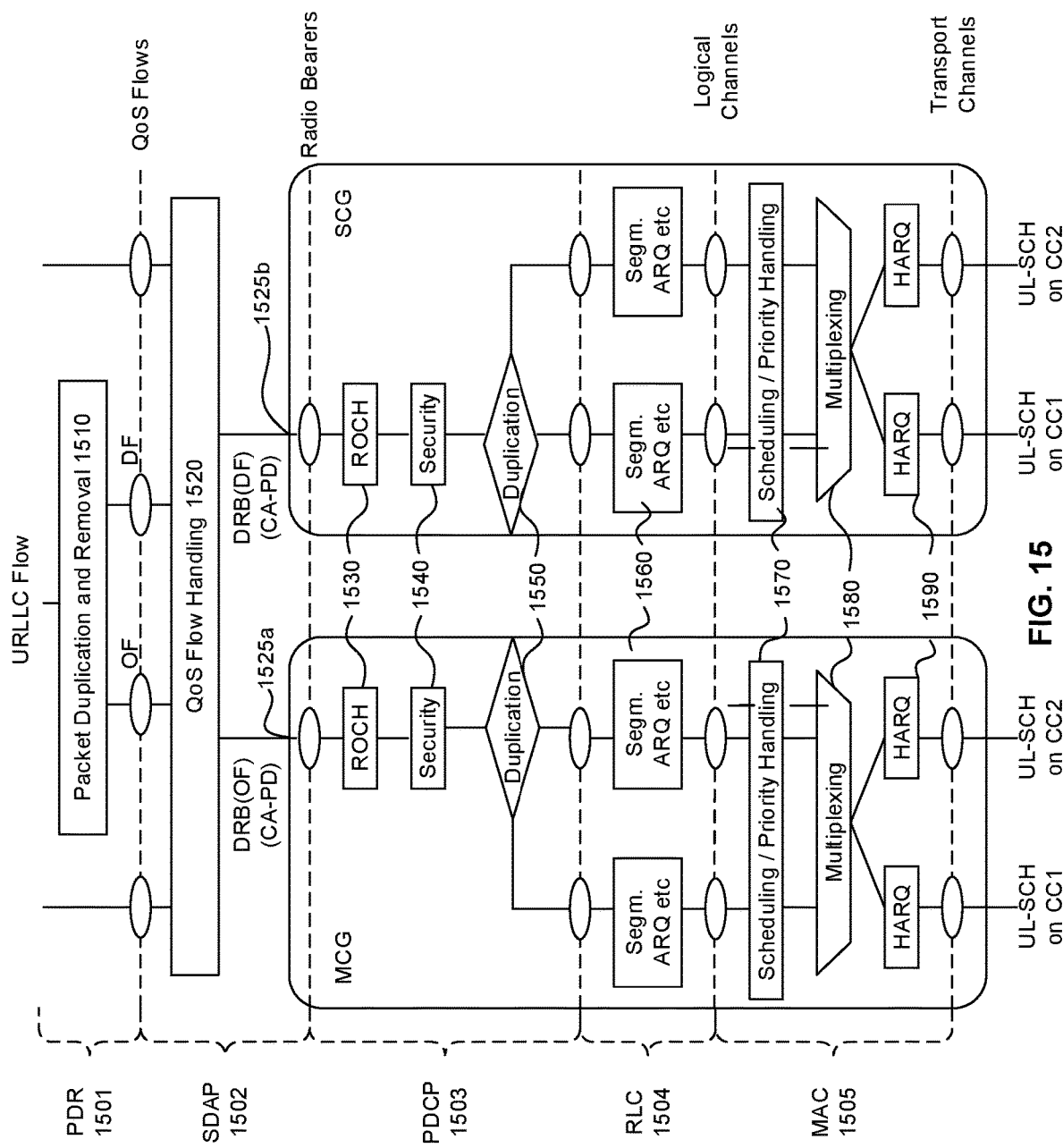
FIG. 15 is a schematic diagram illustrating the UE layer 2 architecture for higher layer packet duplication with a single UPF in the CN, in accordance with embodiments.

FIG. 15 illustrates the UE layer 2 architecture for higher layer packet duplication with a single UPF in the CN.

Referring to FIG. 15, the architecture comprises PDR layer 1501, SDAP layer 1502, PDCP layer 1503, RLC layer 1504 and MAC layer 1505. The Packet Duplication and Removal (PDR) layer 1501 includes packet duplication and removal function 1510, which supports HLPD. The SDAP layer 1502 includes QoS Flow handling function 1520. The PDCP layer 1503 includes RoHC function 1530, security function 1540 and packet duplication function 1550. The RLC 1504 comprises, among other things, Segmentation and Automatic Repeat reQuest (ARQ) functions 1560 known in the art. The MAC 1505 includes Scheduling and Priority functions 1570, multiplexing 1580 and Hybrid Automatic Repeat request (HARM) 1590, known in the art.

According to embodiments, packet duplication and removal function 1510 is configured at a layer of the layer 2 protocol stack above the PDCP layer (e.g. at PDR layer) as higher layer packet duplication is required if both RAN and CN need redundancies for URLLC. The packet duplication and removal function 1510 receives URLLC flows and transmits outputs (e.g. OF and DF) to the SDAP layer 1502, for example to the QoS Flow Handling function 1520. URLLC flows refers to multiple flows of data packets with a certain QoS requirement. Each URLLC flow includes a flow identifier in the packet header of the data packets of the data flow.

According to embodiments, DRBs for CA based packet duplication are configured for packet duplication at 1525a and 1525b at MCG and SCG, respectively. The packets that are sent on the DRBs (CA-PD) at 1525a and 1525b may be duplicated after the RoHC function 1530 and security functions 1540 are performed. The duplication function 1550 may be implemented in the PDCP layer 1503, and may be based on information provided by the MAC layer 1505. The duplication function 1550 may support the PDCP layer duplication, for example in addition to the HLPD of the packet duplication and removal function 1510.

According to embodiments, both MCG and SCG are configured to have their own copies of the packet duplication functions 1550. The packet duplication function 1550 at MCG is connected to the RLC layer of MCG, for example to Segmentation and Automatic Repeat reQuest (ARQ) functions 1560 of MCG; and the packet duplication function 1550 at SCG is connected to the RLC layer of SCG, for example to Segmentation and Automatic Repeat reQuest (ARQ) functions 1560 of SCG.

Figure 16:
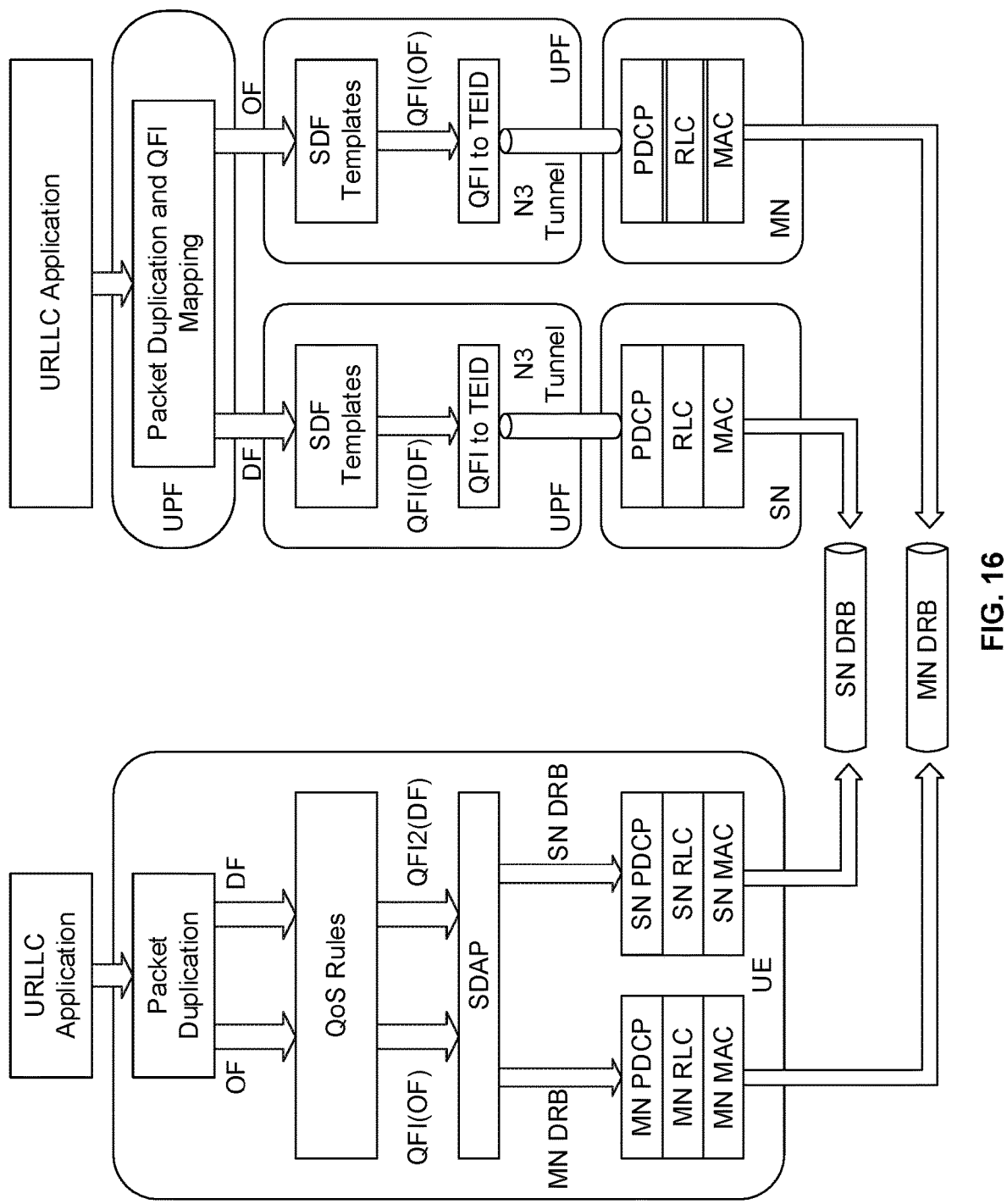
FIG. 16 is a schematic diagram illustrating overall architecture for higher layer packet duplication with two UPFs in the CN, in accordance with embodiments.

As an alternative to the higher layer packet duplication with a single UPF illustrated above, higher layer packet duplication can be accomplished using two separate UPFs (e.g. as shown in FIGS. 13A and 13B). The UPFs can either belong to the same PDU session or two separate PDU sessions that individually handle the duplicate flows. The two UPFs case is illustrated in FIG. 16. The layer 2 architecture in the UE for higher layer packet duplication with multiple UPFs is the same as the one for higher layer packet duplication with a single UPF (e.g. the UE layer 2 architecture illustrated in FIG. 15). The architecture in FIG. 16 is similar to that of FIG. 14, except that rather than the MN and SN both being coupled directly to a single UPF, the MN is coupled to a first UPF and the SN is coupled to a second UPF. The first and second UPFs may perform functions such as mapping QFI to TED and packet classification using SDF templates. The first and second UPFs may be coupled to a further UPF which performs packet duplication and QFI mapping.

According to embodiments of the present invention, packet duplication (both at the PDCP layer and higher layer) may be selectively activated when required, and deactivated when not required, in order to utilize network resources efficiently. The layer and type of packet duplication may also be controllably adjusted in response to input in order to provide for a layer and type of packet duplication which is appropriate to a given situation (e.g. involving signal levels, noise levels, traffic levels, priority, reliability requirements, etc.).

Indications (e.g. transmitted from a RAN node to a UE) that packet duplication is required are referred to generally as packet duplication indicators. Such indications may be self-contained messages or indicators contained within larger messages. Indications that PDCP layer packet duplication are required are referred to as PDCP duplication indicators. Indications that higher layer packet duplication are required are referred to as higher layer duplication indicators. In some embodiments, the indications can specify details as to how the duplication is to be performed. By way of example, packet duplication indicators are described below primarily as MAC control elements (CE), however it should be understood that the indicators can take other forms, such as radio resource control (RRC) messages.

In some embodiments, PDCP packet duplication may be controlled using a MAC structure that can carry control information for PDCP packet duplication. One such MAC structures is a MAC Control Element (CE). In various embodiments, the MAC CE may be sent from the MN and SN independently in order to indicate whether or not the UE should activate packet duplication at the PDCP. The UE may perform a packet duplication action (or not) based on a combination of the two MAC CEs.

According to embodiments, a new PDCP duplication MAC CE is provided in order to support multiple redundant links (e.g. greater than two redundant links). The new PDCP duplication MAC CE may indicate the number of links required to satisfy the required reliability.

The dynamic control of packet duplication can be extended to control higher layer packet duplication. For example, an additional MAC CE may be introduced to dynamically control the higher layer packet duplication.

In some embodiments, higher layer packet duplication may be activated when packet duplication is required at CN separately from RAN nodes. In some embodiments, higher layer packet duplication may be triggered by the RAN nodes when the target reliability requirement cannot be met by the packet duplication at RAN node only (e.g. using just PDCP duplication).

PDCP Duplication

PDCP duplication may involve the following cases: (i) CA based packet duplication with multiple links from a single node; and (ii) CA and DC based packet duplication when a split bearer is configured for DC and multiple carriers are available at one or both nodes (e.g. MN and SN).

According to some embodiments, each of two RAN nodes may transmit a DL MAC CE in order to dynamically control packet duplication across multiple links. The DL MAC CE may indicate the carriers that should be activated for packet duplication for the associated DRB. The number of activated carriers represents the number of duplicate packets that should be transmitted to satisfy a target reliability.

FIG. 17A illustrates the formats of the PDCP packet duplication MAC CE comprising a MAC CE Header 1710 and the MAC CE payload 1720. Referring to FIG. 17A, the MAC CE header 1710 comprises a logical channel identifier (LCID). The MAC CE payload 1720 comprises a PDCP packet duplication indicator including DRB ID, DC flag and CA bitmap. The DRB ID is used to identify the DRB. The DC flag is used when the combined CA and DC architecture is configured. The DC flag may be set, when the reliability cannot be satisfied with the available carriers at the given RAN node, in order to indicate that DC based PDCP packet duplication is to be activated. The CA-PD bitmap is used to indicate which carriers should be used for CA based PDCP packet duplication.

FIG. 17B illustrates an example set of PDCP packet duplication MAC CEs (e.g. MAC CE 1730 and MAC CE 1740) in the combined CA and DC architecture, for example when the DC flag indicates the combined CA and DC architecture is configured. In the MAC CE fields, "A" refers to "activate" and "D" refers to "deactivate." Here, the MAC CE 1730 is a MAC CE sent by the MN and the MAC CE 1740 is a MAC CE sent by the SN. After the UE receives the MAC CEs 1730 and 1740 from MN and SN, the UE combines the two MAC CEs and determines whether or not MN and/or SN should be used. In this example illustrated in FIG. 17B, since the DC flags in both MAC CE 1730 and MAC CE 1740 indicate that DC duplication is activated, the UE may determine both MN and SN should be used to meet the reliability requirement. In addition, packet duplication may be also used through CA duplication at the MN; and a single carrier may be used at the SN. This is because two carriers are activated in the MN MAC CE 1730 and one carrier is activated in the SN MAC CE 1740.

If one of the MN and SN deactivates the DC flag in their MAC CEs, the UE may assume that the node can satisfy reliability requirements without using the other node. In this case, the UE can select the best node (or at least an adequately good node) for transmission. In various embodiments, the best node for transmission may be the node that requires the least redundancy. This may refer to DC redundancy, CA redundancy, or a combination thereof.

According to some other embodiments, each RAN node may transmit a DL MAC CE in order to indicate the number of links required for a given carrier to meet the reliability requirement. Since each node may have multiple carriers configured, the MAC CE may include a value indicating channel quality for each carrier.

For example, the value may correspond to the UE's channel quality on the carrier measured by the gNB. Then, the channel quality can be mapped to the required number of links that a similar quality of channel would need to satisfy the reliability requirement. FIG. 18 illustrates an example of mapping of channel quality indicator (CQI) to number of links required to meet the reliability standard.

Referring to FIG. 18, when the channel quality for a carrier is below a threshold $CQI_3$, then the MAC CE for that carrier should indicate that it should not be used for URLLC on that DRB since the channel quality is too poor. If the channel quality for a carrier is in the range between $CQI_3$ and $CQI_2$ (e.g. $CQI_3 < CQI \leq CQI_2$), then the MAC CE for that carrier would indicate that three links (of similar quality) are required to achieve the required reliability. If the channel quality for a carrier is in the range between $CQI_2$ and $CQI_1$ (e.g. $CQI_2 < CQI \leq CQI_1$), the MAC CE for that carrier would indicate that two links (of similar quality) are required. If the channel quality is greater than $CQI_1$, the MAC CE for that carrier would indicate that only one link is required.

The contents of the MAC CEs may include either the CQI range (or approximate CQI) for the link or the number of links required to meet the reliability requirement. In some embodiments, the MAC CEs may be composed of a bitmap where n bits are used to represent the packet duplication information for each carrier configured at the node corresponding to the MAC CE. Example contents of MAC CE for MN and SN are illustrated below in the Tables 1 and 2, respectively. A MAC CE may explicitly indicate the channel quality as in Column 2, or the required number of links as in Column 3.

TABLE 1

Contents of MAC CE for MN.

| Carrier | Channel Quality | Required Number of Links |
|---|---|---|
| $f_1^{(MN)}$ | $CQI_1^{(MN)}$ | $N_{l,1}^{(MN)}$ |
| $f_2^{(MN)}$ | $CQI_2^{(MN)}$ | $N_{l,2}^{(MN)}$ |
| $f_3^{(MN)}$ | $CQI_3^{(MN)}$ | $N_{l,3}^{(MN)}$ |

TABLE 2

Contents of MAC CE for SN.

| Carrier | Channel Quality | Required Number of Links |
|---|---|---|
| $f_1^{(SN)}$ | $CQI_1^{(SN)}$ | $N_{l,1}^{(SN)}$ |
| $f_2^{(SN)}$ | $CQI_2^{(SN)}$ | $N_{l,2}^{(SN)}$ |
| $f_3^{(SN)}$ | $CQI_3^{(SN)}$ | $N_{l,3}^{(SN)}$ |

FIG. 19A illustrates another example MAC CE for packet duplication with CA based or combined CA and DC based architecture, according to an embodiment. Referring to FIG. 19A, the first entry (or field) is the DRB ID. The subsequent entries correspond to the carriers configured at the corresponding node. If four carriers are configured at the node, then there are 4 entries (e.g. $f_1$, $f_2$, $f_3$, $f_4$) following the DRB ID that indicate the packet duplication value for each corresponding carrier. If additional carriers are configured, the MAC CE may include more entries for those additional carriers.

This MAC CE format may be used in the CA architecture as well as in the combined CA and DC architecture. In the combined CA and DC architecture, the DC flag may not be required since the UE can use the number of links required per carrier to determine the best combination of carriers (or at least a combination of carriers with adequate quality) across the two nodes. FIGS. 19B and 19C provide examples for MAC CEs in the combined CA and DC architecture.

Referring to the MAC CE sent by MN (left) and the MAC CE sent by SN (right) illustrated in FIG. 19B, the UE can select carriers 1 and 4 for the MN. Additional carriers on the SN may be not required. That is, the UE determines that, if it uses carriers 1 and 4 from the MN, it can achieve the sufficient reliability using only two carriers. If it were to use, for example, carrier 2 for the MN, it would require three carriers (e.g. MN carrier 2, SN carriers 1 and 4), which would be less efficient.

Referring to the MAC CE sent by MN and SN illustrated in FIG. 19C, the UE, on the other hand, can select carriers 1, 2 for the MN and carrier 1 for the SN. In this case, DC duplication may be required. That is, the UE determines that there are no two carriers that provide the sufficient reliability, but if it uses carrier 1 (or 2) for the MN, and carriers 1 and 4 for the SN, it can achieve the sufficient reliability using three carriers. Reliability can also be achieved using any four carriers, however this is again less efficient. Thus, in some embodiments, the UE may be configured to select the minimum number of carriers that achieves the required reliability, given the MAC CE information. In some embodiments, if both DC and non-DC selections would achieve the required reliability, the UE can select the DC or non-DC option based on other factors, such as whether DC is preferred or not.

According to some other embodiments for the PDCP duplication, MAC CE for CA duplication may be a bitmap indicating which DRBs require PDCP packet duplication. An additional MAC CE may be used to indicate which carriers should be used for CA duplication. The additional MAC CE may be composed of a bitmap indicating the carriers activated for CA duplication. Alternatively, the additional MAC CE may be composed of a bitmap indicating how many links are required to meet the reliability requirement for each carrier.

Higher Layer Packet Duplication

Higher layer packet duplication may be required in the following cases: (i) when redundancy is required in both the RAN and the CN; (ii) when PDCP duplication with a single RAN node cannot satisfy the reliability requirement even if multiple carriers are used at that node; and (iii) when RAN node redundancy is required.

According to embodiments, in order to dynamically activate and deactivate higher layer packet duplication, each RAN node can make a HLPD activation/deactivation determination independently based on the requirement in the CN and the UE's (e.g. reported) Uplink (UL) channel quality on the supported carriers.

If the CN requires duplication through both the MN RAN node and SN RAN, then higher layer packet duplication may be activated. If multiple redundant links are required in the RAN but a single RAN node cannot provide the required number of redundant links, then the higher layer packet duplication may be activated. In some embodiments, the higher layer packet duplication may be activated when the UE is configured with DC having two separate connections to the CN. The higher layer packet duplication may be deactivated when not required.

According to embodiments, each node can independently transmit the higher layer packet duplication command since only direct bearers are used in higher layer packet duplication.

In some embodiments, a RAN node determines when to activate higher layer packet duplication (HLPD) as follows. The RAN node may make a first determination as to whether the UE is configured for DC communication to a MN and a SN. If so, the RAN node further makes a second determination as to whether the CN requires packet duplication and the RAN requires packet duplication. If the second determination is that both the CN and RAN require packet duplication, then HLPD is activated. Otherwise (and when the first determination is that the UE is configured for DC communication to MN and SN), the RAN node further makes a third determination as to whether the RAN requires higher layer packet duplication. If so, HLPD is activated. However, if the second determination is that CN and RAN do not require packet duplication, and the third determination is that the RAN does not require HLPD, then the RAN node determines HLPD is not necessary, and may thus be deactivated explicitly or by default. Also, if the UE is not configured with DC to MN or SN, the RAN node does nothing further with respect to activation of higher layer packet duplication, and HLPD may be deactivated by default.

In some embodiments, and further to the logic described above, if it is determined (e.g. in the second determination) that the CN, but not the RAN, requires packet duplication, then higher layer packet duplication can be performed at the RAN node rather than the UE, thus conserving resources. In an alternative embodiment, if it is determined (e.g. in the second determination) that the CN, but not the RAN, requires packet duplication, then HLPD can nevertheless be activated at the UE.

In some embodiments, the RAN node transmits the higher layer packet duplication command in a DL HLPD MAC CE (DL higher layer packet duplication MAC CE).

The higher layer PD MAC CE format may include a single bit indicating whether or not higher layer PD is required when using the corresponding node. If only one bit is used to indicate whether higher layer PD is required, the information may be included in the MAC CE header as illustrated in FIG. 20. Referring to FIG. 20, the one bit for indicating whether higher layer PD is required may be used as flag and included in the MAC CE header after the logical channel ID bits.

Alternatively, the command for higher layer PD may be included in a MAC CE. In this embodiment, additional information is also be associated with the HLPD command, such as the QoS flow ID (QFI) or DRB ID associated with the higher layer packet duplication. The HLPD command can be per QFI or per DRB ID.

In some embodiments, the UE combines the HLPD bit from the MN and SN as illustrated below in the Table 3:

TABLE 3

Contents of MN HLPD and SN HLPD.

| MN HLPD | SN HLPD | Combined HLPD |
|---------|---------|---------------|
| 1 | 1 | 1 |
| 1 | 0 | 0 (use SN) |
| 0 | 1 | 0 (use MN) |
| 0 | 0 | 0 |

That is, the UE uses HLPD only when both MN and SN indicate to do so. Additionally, the UE uses the MN if only the SN indicates that HLPD is required, and uses the SN if only the MN indicates that HLPD is required.

In another embodiment, the HLPD command is sent by only one of the nodes (e.g. MN) to activate or deactivate higher layer packet duplication. In this embodiment, the HLPD command is a HLPD MAC CE header or an RRC message. In another embodiment, the HLPD command from one or both RAN nodes is an RRC message, PDCP control message or NAS message (e.g. from the AMF or from the SMF).

Combining PDCP Duplication and HLPD

If the UE is configured to have DC with two N3 connections to the CN and each node is capable of supporting multiple carriers, the UE, if required, may perform both PDCP duplication and HLPD concurrently (i.e. on the same source packets). In this case, both the MN and SN may independently transmit the PDCP duplication MAC CE in order to indicate the required CA duplication at the node. A separate HLPD MAC CE may be sent to indicate whether or not higher layer packet duplication is required.

In some embodiments, the HLPD command is included in the PDCP duplication MAC CE header instead of the MAC CE. The HLPD and PDCP duplication fields can be combined into a single MAC CE. In some embodiments, after receiving the MAC CEs from both nodes, the UE may combine the HLPD commands by using, for example, the 'AND' operation as illustrated above in the Table 3. In some embodiments, the UE uses the PDCP duplication MAC CE to determine whether CA duplication is required at the corresponding node.

In some embodiments, when the HLPD command is set to activate the HLPD, the UE uses at least one carrier from both nodes (e.g. MN and SN) even if it is indicated by one of the nodes that it can meet the reliability requirement using one or more of its carriers. The reason for using at least one carrier from both MN and SN is that redundancy may be required in the CN. In some embodiments, the UE consequently selects DC options over CA-only options for PDCP duplication.

For example, if the HLPD is activated and the UE requires two redundant links in the RAN, the UE may transmit to both the MN and SN simultaneously rather than performing CA based PD on only one of the nodes. In this case, the PDCP duplication MAC CE may indicate that PDCP duplication is deactivated.

In another embodiment, if the UE requires more than two redundant links and only two carriers are available at the MN, the MN may transmit an HLPD MAC CE in order to activate the higher layer packet duplication. The MN transmits the HLPD MAC CE even if the CN does not require duplication. Once the UE takes into account the PDCP MAC CE from the MN and the HLPD MAC CE, the UE may determine that more than two redundant links are required using both MN and SN.

An example of the number of (redundant) links used by UE after combining the PDCP and HDPD commands (e.g. from corresponding MAC CEs) is illustrated below in the Table 4. This facilitates dynamic control of PDCP packet duplication using independent MAC CEs from MN and SN (first and second columns) and a (e.g. separate) MAC CE (third aggregate column) to control higher layer packet duplication.

TABLE 4

| MN MAC CE (CA DRB) | SN MAC CE (CA DRB) | Higher Layer Packet Duplication MAC CE | | |
|---|---|---|---|---|
| | | Higher Layer PD (Use MN + SN) | MN Only | SN Only |
| Activate (2) | Activate (2) | 4 | 2 | 2 |
| Activate (2) | Deactivate (1) | 3 | 2 | 1 |
| Deactivate (1) | Activate (2) | 3 | 1 | 2 |
| Deactivate (1) | Deactivate (1) | 2 | 1 | 1 |

According to Table 4, when the UE receives a PDCP duplication MAC CE from the MN to activate 2 carriers and a PDCP duplication MAC from the SN to activate 2 carriers, the UE may use 4 redundant links upon activation of the HLPD. If the UE receives the MN MAC CE or the SN MAC CE to deactivate PDCP duplication (i.e. use 1 carrier), the UE may use 3 redundant links upon activation of the HLPD. If the UE receives a PDCP duplication MAC CE from both the MN and SN to deactivate PDCP duplication (i.e. use 1 carrier each), the UE may use only 2 redundant links (e.g. one link from MN and the other link from SN) upon activation of the HLPD, as illustrated above in the Table 3. If the HLPD is deactivated, the UE may use either two links from the MN or two links from the SN.

Support for Time Sensitive Networks

In Time Sensitive Networks (TSN), packets may need to be sent at precise times in order to ensure reliable communication. For packet transmission with time precision, in some embodiments, the RAN node and the UE may be synchronized with a clock. The RAN node and the UEs (e.g. IoT UE devices) can have an interface with the same clock. The precise timing information may be received from the clock for synchronization of the RAN node and the UE. This precise timing information may be provided to the RAN node and the UE. The RAN node may use the provided precise timing information in order to determine the appropriate sub-frame for (packet) transmission.

The RAN nodes may use the precise timing information of the packet arrival to pre-configure resources using semi-persistent scheduling (SPS) or a configured grant for uplink transmission. The timing information may be included in each transmitting data packet and may be provided by the application to the RAN. The RAN may set up schedules for each packet according to the timing information included in the packet.

Figure 21:
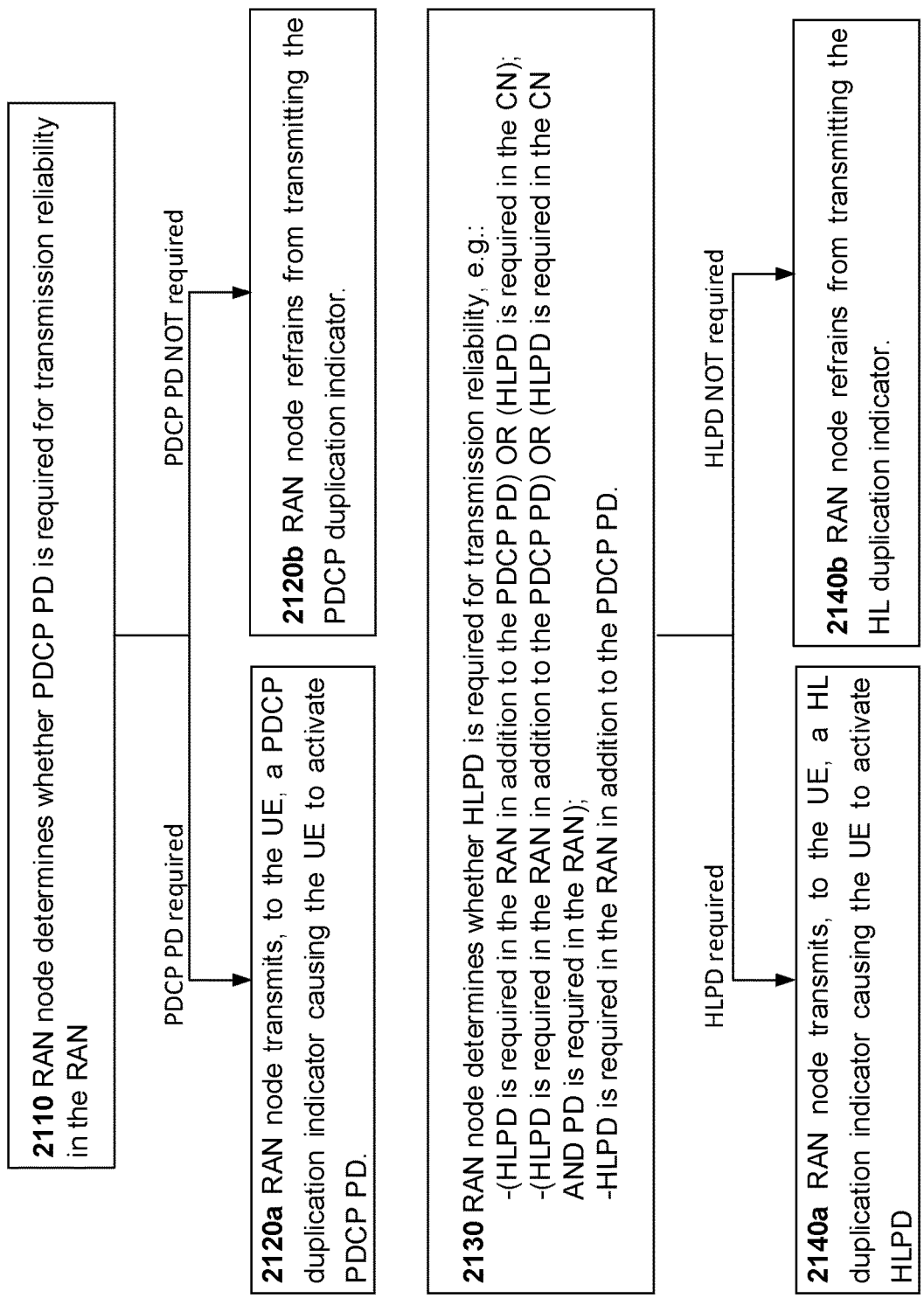
FIG. 21 is a flow diagram illustrating a method for supporting packet duplication in a communication network comprising a radio access network (RAN) and a core network (CN) and serving a user equipment (UE) device.

FIG. 21 illustrates a method for supporting packet duplication in a communication network comprising a radio access network (RAN) and a core network (CN) and serving a user equipment (UE) device, according to embodiments. At 2110, a RAN node of the RAN determines whether packet data convergence protocol (PDCP) layer packet duplication (PD) is required for transmission reliability in the RAN. If PDCP PD is required, the RAN node, at 2120a, transmits, to the UE, a PDCP duplication indicator. According to embodiments, the indicator causes the UE to activate PDCP packet duplication. If PDCP PD is not required for transmission reliability in the RAN, the RAN node, at 2120b, refrains from transmitting the PDCP duplication indicator.

At 2130, the RAN node makes a second determination as to whether higher layer packet duplication (i.e. HLPD, at a layer above the PDCP layer) is required for transmission reliability. If HLPD is required, the RAN node, at 2140a, transmits, to the UE, a higher layer (HL) duplication indicator causing the UE to activate HLPD. If HLPD is not required, the RAN node, at 2140b, refrains from transmitting the HL duplication indicator.

Refraining from transmitting an indicator may comprise refraining from transmitting any indicator, or transmitting a message (e.g. a MAC CE) in which indicators not to activate the corresponding packet duplication are explicitly set. This may be referred to as a negative indicator.

As illustrated, the second determination at 2130 can take a variety of forms. In one embodiment, the second determination is that the higher layer packet duplication is required, in addition to the PDCP packet duplication, for transmission reliability in the RAN, OR that the higher layer packet duplication is required for transmission reliability in the CN. In other embodiments, the second determination is that the higher layer packet duplication is required, in addition to the PDCP packet duplication, for transmission reliability in the RAN, OR that: the higher layer packet duplication is required for transmission reliability in the CN AND packet duplication (e.g. PDCP packet duplication, higher layer packet duplication, or both) is also required for transmission reliability in the RAN. In other embodiments, the second determination is that the higher layer packet duplication is required, in addition to the PDCP packet duplication, for transmission reliability in the RAN. The determinations 2110 and 2130 can be performed sequentially, concurrently, independently or interdependently.

Figure 22:
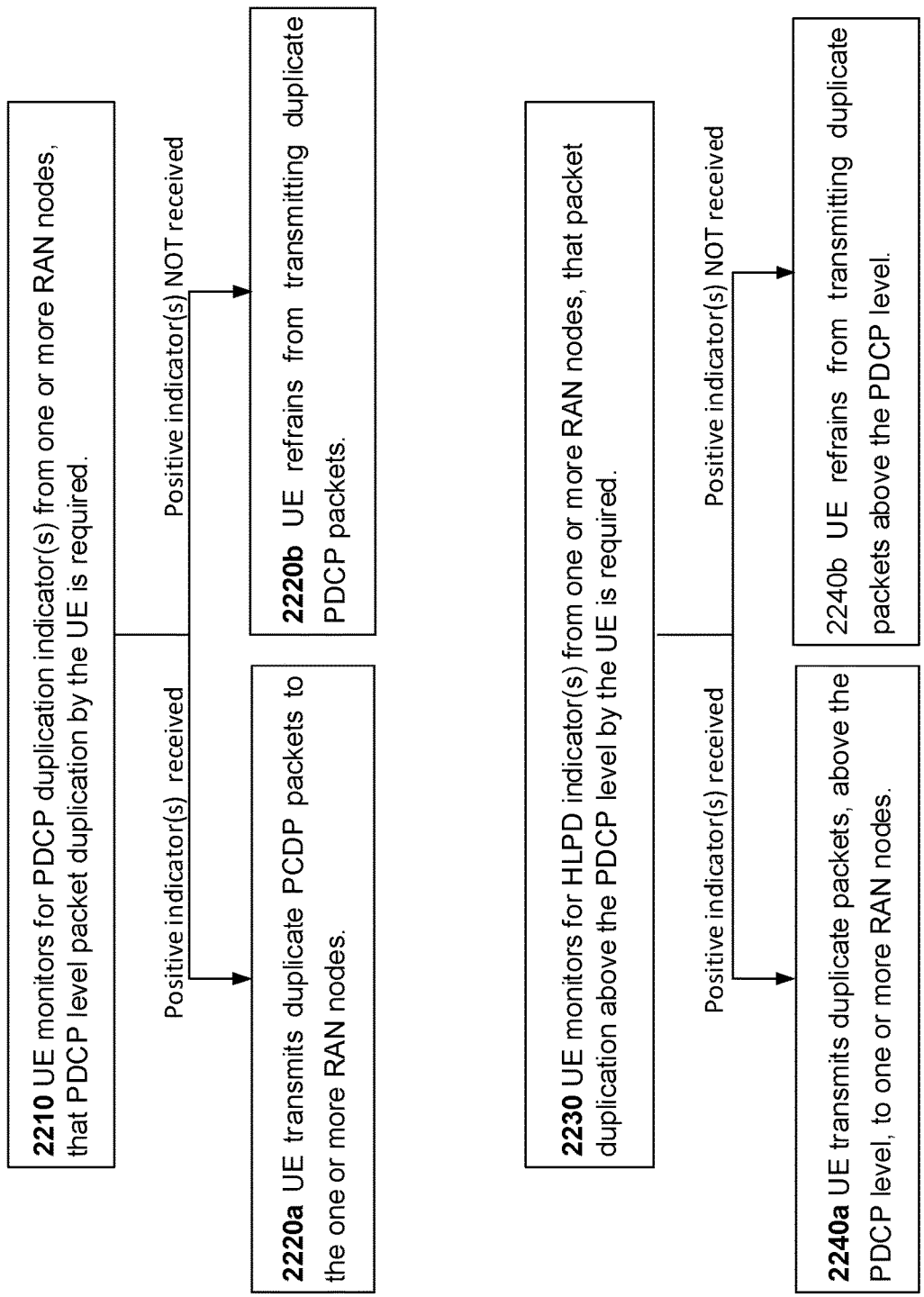
FIG. 22 is a flow diagram illustrating a method for supporting packet duplication in a communication network comprising one or more radio access network (RAN) nodes.

FIG. 22 illustrates a method for supporting packet duplication in a communication network comprising one or more radio access network (RAN) nodes, according to embodiments. At 2210, UE monitors for (and may or may not receive from at least one of the one or more RAN nodes) one or more packet data convergence protocol (PDCP) duplication indicators. Each PDCP duplication indicator is indicative that PDCP layer packet duplication (PD) by the UE is required. If the UE receives one or more positive PDCP duplication indicators, the UE, at 2220a, transmits duplicate PCDP packets to at least one of the one or more RAN nodes. If the UE does not receive a positive PDCP duplication indicator, the UE, at 2220b, refrains from transmitting said duplicate PDCP packets. If PDCP duplication indicators are received from multiple RAN nodes, the UE may determine how transmit the duplicate packets based on the multiple indicators.

At 2230, the UE monitors for (and may or may not receive from at least one of the one or more RAN nodes) one or more higher layer (HL) packet duplication indicators. Each HLPD indicator is indicative that packet duplication at a layer above the PDCP layer by the UE is required. If the UE receives one or more positive HLPD indicators, the UE, at 2240a, transmits duplicate packets, above the PDCP layer, to at least one of the one or more RAN nodes. If the UE does not receive a positive HLPD indicator, the UE, at 2240b, refrains from transmitting said duplicate packets above the PDCP layer. The monitoring operations 2210 and 2230 can be performed sequentially, concurrently, independently or interdependently. If HLPD indicators are received from multiple RAN nodes, the UE may determine how transmit the duplicate packets based on the multiple indicators.

Figure 23:
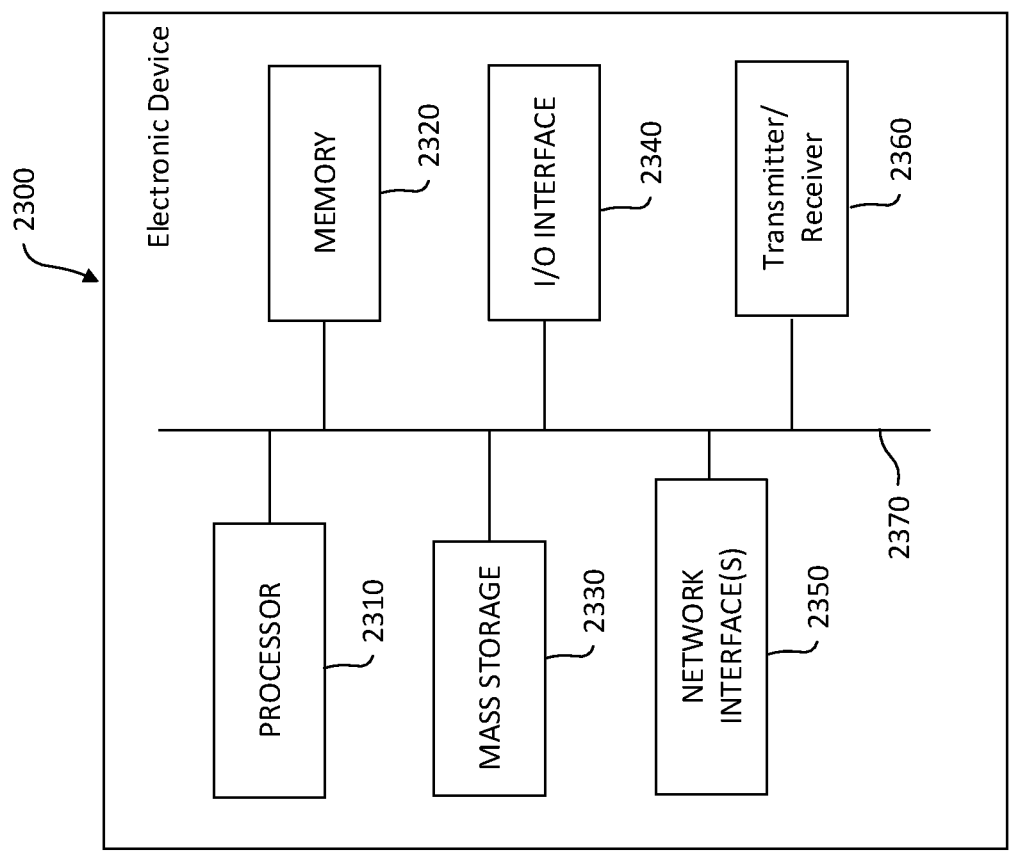
FIG. 23 is a schematic diagram illustrating an electronic device in accordance with embodiments.

FIG. 23 is a schematic diagram of an electronic device 2300 that may perform any or all of operations of the above methods and features explicitly or implicitly described herein, according to different embodiments of the present invention. For example, the electronic device 2300 may be configured as a UE, such as an IoT UE. Further, the electronic device 2300 may be configured as a network element hosting any of the network entities described herein (e.g., RAN node, gNB, master node, secondary node).

As shown, the device includes a processor 2310, memory 2320, non-transitory mass storage 2330, I/O interface 2340, network interface 2350, and a transmitter/receiver 2360, all of which are communicatively coupled via bi-directional bus 2370. According to certain embodiments, any or all of the depicted elements may be utilized, or only a subset of the elements. Further, the device 2300 may contain multiple instances of certain elements, such as multiple processors, memories, or transmitters/receivers. Also, elements of the hardware device may be directly coupled to other elements without the bi-directional bus.

The memory 2320 may include any type of non-transitory memory such as static random access memory (SRAM), dynamic random access memory (DRAM), synchronous DRAM (SDRAM), read-only memory (ROM), any combination of such, or the like. The mass storage element 2330 may include any type of non-transitory storage device, such as a solid state drive, hard disk drive, a magnetic disk drive, an optical disk drive, USB drive, or any computer program product configured to store data and machine executable program code. According to certain embodiments, the memory 2320 or mass storage 2330 may have recorded thereon statements and instructions executable by the processor 2310 for performing any of the aforementioned method operations described above.

In addition or alternatively to a processor executing program instructions stored in memory, embodiments of the invention can provide for a device, such as a RAN node or UE, which includes digital electronics, analog electronics, or a combination thereof, which are configured to perform the operations as described herein. For example, the electronics may include a system of digital logic gates, an application specific integrated circuit, a field programmable gate array, or a combination thereof. The electronics may be configured to receive and process digital data to make determinations, and trigger transmissions or behaviours based on the determinations, for example.

Embodiments of the present invention provide a system and method for transmission redundancy. This may be applied for ultra reliable transmission in industrial IoT applications. Embodiments of the present invention may involve redundant transmission with two links, or with three or more links. Embodiments may involve dynamic control of Packet Data Convergence Protocol (PDCP) packet duplication and higher layer packet duplication. Embodiments of the present invention may provide for combined and coordinated PDCP duplication and higher layer packet duplication. The packet duplication (PDCP, higher layer, or both) may be dynamically activated and deactivated in order to apply it only when necessary, thus avoiding spectral inefficiencies.

According to embodiments of the present invention, there is provided a method for supporting packet duplication in a communication network comprising a radio access network (RAN) and a core network (CN) and serving a user equipment (UE) device. The method may be performed by a RAN node having a processor operatively coupled to memory. The method includes, after a first determination that packet data convergence protocol (PDCP) layer packet duplication is required for transmission reliability in the RAN, transmitting, to the UE, a PDCP duplication indicator. The PDCP duplication indicator causes the UE to activate PDCP packet duplication. The method further includes, absent the first determination, refraining from transmitting the PDCP duplication indicator. The method further includes, after a second determination that it is necessary to do so, transmitting, to the UE, a higher layer duplication indicator causing the UE to activate higher layer packet duplication. The method includes absent the second determination, refraining from transmitting the higher layer duplication indicator.

In some embodiments, the second determination is that at least one of the following is satisfied: the higher layer packet duplication is required, in addition to the PDCP packet duplication, for transmission reliability in the RAN; and the higher layer packet duplication is required for transmission reliability in the CN. In other embodiments, the second determination is that at least one of the following holds: the higher layer packet duplication is required, in addition to the PDCP packet duplication, for transmission reliability in the RAN; and the higher layer packet duplication is required for transmission reliability in the CN and packet duplication (e.g. PDCP packet duplication, higher layer packet duplication, or both) is also required for transmission reliability in the RAN. In other embodiments, the second determination is that the higher layer packet duplication is required, in addition to the PDCP packet duplication, for transmission reliability in the RAN.

According to embodiments of the present invention, there is provided a method for supporting packet duplication in a communication network, comprising one or more radio access network (RAN) nodes. The method may be performed by a user equipment (UE) device, for example having a processor operatively coupled to memory (or other electronics performing an equivalent function) and a transmitter/receiver. The method includes, after receipt, from at least one of the one or more RAN nodes, of a PDCP duplication indicator indicative that packet data convergence protocol (PDCP) layer packet duplication by the UE is required, transmitting duplicate PCDP packets to at least one of the one or more RAN nodes, and absent receipt of the PDCP duplication indicator, refraining from transmitting said duplicate PDCP packets. The method further includes after receipt, from at least one of the one or more RAN nodes, of a higher layer duplication indicator indicative that packet duplication above the PDCP layer by the UE is required, transmitting duplicate packets, above the PDCP layer, to at least one of the one or more RAN nodes, and absent receipt of the higher layer duplication indicator refraining from transmitting said duplicate packets above the PDCP layer otherwise.

According to embodiments of the present invention, there is provided a radio access network (RAN) node apparatus in a communication network comprising a RAN and a core network (CN) and serving a user equipment (UE) device. The RAN node has a processor operatively coupled to memory (or other electronics performing an equivalent function), and a transmitter/receiver. The RAN node is configured, after a first determination that packet data convergence protocol (PDCP) layer packet duplication is required for transmission reliability in the RAN, to transmit, to the UE, a PDCP duplication indicator causing the UE to activate PDCP packet duplication, and absent the first determination, refrain from transmitting the PDCP duplication indicator. The RAN node is further configured, after a second determination that it is necessary to do so, to transmit, to the UE, a higher layer duplication indicator causing the UE to activate higher layer packet duplication, and absent the second determination, refrain from transmitting the higher layer duplication indicator. The second determination may be as already described above.

According to embodiments of the present invention, there is provided a user equipment (UE) apparatus in a communication network comprising one or more radio access network (RAN) nodes. The UE is configured, after receipt, from at least one of the one or more RAN nodes, of a PDCP duplication indicator indicative that packet data convergence protocol (PDCP) layer packet duplication by the UE is required, to transmit duplicate PCDP packets to at least one of the one or more RAN nodes, and absent receipt of the PDCP duplication indicator, to refrain from transmitting said duplicate PDCP packets. The UE is configured, after receipt, from at least one of the one or more RAN nodes, of a higher layer duplication indicator indicative that packet duplication above the PDCP layer by the UE is required, to transmit duplicate packets, above the PDCP layer, to at least one of the one or more RAN nodes, and absent receipt of the higher layer duplication indicator, to refrain from transmitting said duplicate packets above the PDCP layer.

According to embodiments of the present invention, there is provided a method for supporting packet duplication in a communication network comprising a radio access network (RAN) and a core network (CN) and serving a user equipment (UE) device. The method may be performed by a RAN node having a processor operatively coupled to memory (or other electronics performing an equivalent function), and a transmitter/receiver. The method includes, after a determination that it is necessary to do so, transmitting, to the UE, a higher layer duplication indicator causing the UE to activate higher layer packet duplication. The method includes absent the determination that it is necessary to do so, refraining from transmitting the higher layer duplication indicator. The determination in this embodiment may be the same as the second determination as described above.

According to embodiments of the present invention, there is provided a method for supporting packet duplication in a communication network comprising one or more radio access network (RAN) nodes. The method may be performed by a user equipment (UE) device. The method includes, after receipt (from at least one of the one or more RAN nodes) of a higher layer duplication indicator indicative that packet duplication above the packet data convergence protocol (PDCP) layer by the UE is required: transmitting duplicate packets, above the PDCP layer, to at least one of the one or more RAN nodes. The method further includes absent receipt of higher layer duplication indicator, refraining from transmitting said duplicate packets above the PDCP layer.

According to embodiments of the present invention, there is provided a method for supporting packet duplication in a communication network comprising a radio access network (RAN) and a core network (CN) and serving a user equipment (UE) device. The method may be performed by a RAN node having a processor operatively coupled to memory (or other electronics performing an equivalent function) and a transmitter/receiver. The method includes, after a determination that packet data convergence protocol (PDCP) layer packet duplication is required for transmission reliability in the RAN: transmitting, to the UE, a PDCP duplication indicator causing the UE to activate PDCP packet duplication. The method includes absent the determination that PDCP layer packet duplication is required, refraining from transmitting the PDCP duplication indicator otherwise.

According to embodiments of the present invention, there is provided a method for supporting packet duplication in a communication network comprising one or more radio access network (RAN) nodes. The method is performed by a user equipment (UE) device. The method includes, after receipt (from at least one of the one or more RAN nodes) of a PDCP duplication indicator indicative that packet data convergence protocol (PDCP) layer packet duplication by the UE is required: transmitting duplicate PCDP packets to at least one of the one or more RAN nodes, and absent receipt of the PDCP duplication indicator, refraining from transmitting said duplicate PDCP packets otherwise.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method for supporting packet duplication in a communication network, the method comprising:
   receiving, by a user equipment (UE) device, a medium access control (MAC) control element (CE) sent by at least one of a master radio access network (RAN) node and a secondary RAN node in the communication network, the MAC CE comprising a packet data convergence protocol (PDCP) duplication indicator for a data radio bearer (DRB), the PDCP duplication indicator including a DRB identifier and a carrier selection field indicating one or more carriers associated with the DRB to be activated or deactivated for PDCP layer packet duplication, the PDCP duplication indicator further comprising a RAN node selection field indicating whether the master RAN node and secondary RAN node may be used for PDCP layer packet duplication;
   transmitting, by the UE device, duplicate PDCP packets to one or more of the master RAN and secondary RAN node indicated by the RAN node selection field and using the one or more carriers indicated by the carrier selection field,
   wherein the MAC CE sent by at least one of the master RAN node and the second RAN node further comprises a higher layer duplication indicator indicative that user plane packet duplication above the PDCP layer is required; and transmitting higher layer duplication packets to one or more of the master RAN and the secondary RAN node.

2. The method of claim 1 wherein the carrier selection field of the MAC CE comprises a bitmap, the bitmap comprising a plurality of bits, each of the plurality of bits of the bitmap indicating whether the corresponding carrier is to be used (activated) or not used (deactivated) for transmission of duplicate PDCP packets.

3. The method of claim 1 wherein the higher layer duplication indicator comprises a field indicating whether the UE device is to perform the higher layer packet duplication.

4. The method of claim 1, wherein the PDCP duplication indicator and the higher layer duplication indicator are transmitted in a payload of the MAC CE.

5. The method of claim 1, wherein the duplicate PDCP packets are user plane data packets or control plane signaling packets.

6. The method of claim 1, wherein the duplicate PDCP packets are transmitted by the UE device using a carrier aggregation (CA) architecture according to the carrier selection field, a dual connectivity (DC) architecture according to the RAN node selection field, or a combined CA and DC architecture.

7. The method of claim 6, wherein the DC architecture comprises a single connection to a core network; or wherein the DC architecture comprises two separate connections to the core network and different ones of the duplicate packets above the PDCP layer are communicated via different ones of the two separate connections.

8. The method of claim 1 further comprising:
   receiving, by the UE device, a master RAN node PDCP duplication indicator in a MAC CE from the master RAN node and an SN PDCP duplication indicator in a MAC CE from the secondary RAN node wherein the DRB identifier in the master RAN node PDCP duplication indicator is the same as the DRB identifier in the secondary RAN node PDCP duplication indicator;
   transmitting, by the UE device, duplicate PDCP packets associated with the DRB to the master RAN node using the one or more carriers indicated by the carrier selection field of the master RAN node PDCP duplication indicator; and transmitting, by the UE device, duplicate PDCP packets associated with the DRB to the secondary RAN node using the one or more carriers indicated by the carrier selection field of the secondary RAN node PDCP duplication indicator.

9. A user equipment (UE) device in a communication network, the UE device configured to:

receive a medium access control (MAC) control element (CE) sent by at least one of a master radio access network (RAN) node and a secondary RAN node, the MAC CE comprising a packet data convergence protocol (PDCP) duplication indicator for a data radio bearer (DRB), the PDCP duplication indicator including a DRB identifier and a carrier selection field indicating one or more carriers associated with the DRB to be activated or deactivated for PDCP layer packet duplication, the PDCP duplication indicator further comprising a RAN node selection field indicating whether the master RAN node and the secondary RAN node may be used for PDCP layer packet duplication;

transmit duplicate PDCP packets to one or more of the master RAN node and the secondary RAN node indicated by the RAN node selection field and using the one or more carriers indicated by the carrier selection field, wherein the MAC CE sent by at least one of the master RAN node and the second RAN node further comprises a higher layer duplication indicator indicative that user plane packet duplication above the PDCP layer is required; and the UE device is further configured to transmit higher layer duplication packets to one or more of the master RAN and the secondary RAN node.

10. The UE device of claim 9 wherein the carrier selection field of the MAC CE comprises a bitmap, the bitmap comprising a plurality of bits, each of the plurality of bits of the bitmap indicating whether the corresponding carrier is to be used (activated) or not used (deactivated) for transmission of duplicate PDCP packets.

11. The UE device of claim 9 wherein the higher layer duplication indicator comprises a field indicating whether the UE device is to perform the higher layer packet duplication.

12. The UE device of claim 9, wherein the PDCP duplication indicator and the higher layer duplication indicator are transmitted in a payload of the MAC CE.

13. The UE device of claim 9, wherein the duplicate PDCP packets are user plane data packets or control plane signaling packets.

14. The UE device of claim 9, wherein the duplicate PDCP packets are transmitted by the UE device using a carrier aggregation (CA) architecture according to the carrier selection field, a dual connectivity (DC) architecture according to the RAN node selection field, or a combined CA and DC architecture.

15. The UE device of claim 14, wherein the DC architecture comprises a single connection to a core network; or wherein the DC architecture comprises two separate connections to the core network and different ones of the duplicate packets above the PDCP layer are communicated via different ones of the two separate connections.

16. A non-transitory computer readable medium storing instructions executable by a user equipment (UE) device in a communication network, the instructions when executed by the UE device causing the UE device to:

receive a medium access control (MAC) control element (CE) sent by at least one of a master radio access network (RAN) node and a secondary RAN node in a communication network, the MAC CE comprising a packet data convergence protocol (PDCP) duplication indicator for a data radio bearer (DRB), the PDCP duplication indicator including a DRB identifier and a carrier selection field indicating one or more carriers associated with the data radio bearer to be activated or deactivated for PDCP layer packet duplication, the PDCP duplication indicator further comprising a RAN node selection field indicating whether the MN and SN may be used for PDCP layer packet duplication;

transmit duplicate PDCP packets to one or more of the master RAN node and the secondary RAN node indicated by the RAN node selection field and using the one or more carriers indicated by the carrier selection field, wherein the MAC CE sent by at least one of the master RAN node and the second RAN node further comprises a higher layer duplication indicator indicative that user plane packet duplication above the PDCP layer is required; and the instruction when executed by the UE device further cause the UE device to transmit higher layer duplication packets to one or more of the master RAN and the secondary RAN node.

17. The non-transitory computer readable medium of claim 16 wherein the carrier selection field of the MAC CE comprises a bitmap, the bitmap comprising a plurality of bits, each of the plurality of bits of the bitmap indicating whether the corresponding carrier is to be used (activated) or not used (deactivated) for transmission of duplicate PDCP packets.

* * * * *

UNITED STATES PATENT AND TRADEMARK OFFICE
CERTIFICATE OF CORRECTION

PATENT NO. : 11,184,275 B2
APPLICATION NO. : 16/684093
DATED : November 23, 2021
INVENTOR(S) : Sophie Vrzic and Jaya Rao It is certified that error appears in the above-identified patent and that said Letters Patent is hereby corrected as shown below:

In the Specification

Column 7, Line 2:
"(HARD)" should read --(HARQ)--

Column 7, Line 47:
"(HARD)" should read --(HARQ)--

Column 11, Line 52:
"(HARM)" should read --(HARQ)--

Column 12, Line 33:
"TED" should read --TEID--

Signed and Sealed this
Tenth Day of December, 2024

Katherine Kelly Vidal
*Director of the United States Patent and Trademark Office*